(12) United States Patent
Kulkarni et al.

(10) Patent No.: US 9,456,231 B2
(45) Date of Patent: Sep. 27, 2016

(54) ELECTRONIC DEVICE, CONTROL METHOD THEREOF AND SYSTEM

(71) Applicant: Samsung Electronics Co., Ltd., Suwon-si, Gyeonggi-do (KR)

(72) Inventors: Girish Rameshrao Kulkarni, Bangalore (IN); Roopa Sheshadri Kotiganahally, Bangalore (IN); Raghavendra Kalose Mathsyendranath, Bangalore (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 14/728,407

(22) Filed: Jun. 2, 2015

(65) Prior Publication Data
US 2015/0358650 A1 Dec. 10, 2015

(30) Foreign Application Priority Data

Jun. 6, 2014 (IN) .......................... 2798/CHE/2014
Apr. 23, 2015 (KR) ...................... 10-2015-0057268

(51) Int. Cl.
| | |
|---|---|
| H04N 9/80 | (2006.01) |
| H04N 21/235 | (2011.01) |
| H04N 21/231 | (2011.01) |
| H04N 21/274 | (2011.01) |
| H04N 21/433 | (2011.01) |
| H04N 21/435 | (2011.01) |
| H04N 21/63 | (2011.01) |
| H04N 21/84 | (2011.01) |

(52) U.S. Cl.
CPC ........ *H04N 21/2353* (2013.01); *H04N 21/231* (2013.01); *H04N 21/274* (2013.01); *H04N 21/435* (2013.01); *H04N 21/4334* (2013.01); *H04N 21/632* (2013.01); *H04N 21/84* (2013.01)

(58) Field of Classification Search
CPC ................................ G06Q 10/10; H04N 5/85
USPC .......................... 386/200, 201, 248; 709/204
See application file for complete search history.

(56) References Cited

U.S. PATENT DOCUMENTS

| | | | |
|---|---|---|---|
| 7,302,274 B2 | 11/2007 | Makela et al. | |
| 7,884,855 B2 | 2/2011 | Ortiz | |
| 7,885,924 B2 * | 2/2011 | Jones ................ | G06F 17/30029 707/620 |
| 8,526,778 B2 | 9/2013 | Lee et al. | |
| 9,129,640 B2 * | 9/2015 | Hamer ................. | G11B 27/034 |
| 2008/0063287 A1 | 3/2008 | Klamer et al. | |
| 2011/0246437 A1 * | 10/2011 | Kollenkark ............. | H04L 67/10 707/706 |
| 2012/0057851 A1 * | 3/2012 | Yoshimine ........... | G11B 27/034 386/278 |

(Continued)

FOREIGN PATENT DOCUMENTS

| | | |
|---|---|---|
| CN | 103336832 A | 10/2013 |
| EP | 2 573 772 A1 | 3/2013 |

(Continued)

*Primary Examiner* — Thai Tran
*Assistant Examiner* — Mishawn Hunter
(74) *Attorney, Agent, or Firm* — Jefferson IP Law, LLP

(57) ABSTRACT

A method of a first electronic device for performing multimedia recording is provided. The method includes recording, by the first electronic device, a first multimedia stream, generating a first metadata associated with the first multimedia stream, receiving at least one second metadata associated with a second multimedia stream recorded by at least one second electronic device, and generating a final multimedia file based on an analysis of the first metadata and the at least one second metadata.

21 Claims, 28 Drawing Sheets

(56) References Cited

U.S. PATENT DOCUMENTS

| | | | |
|---|---|---|---|
| 2012/0331502 A1* | 12/2012 | McIntire | H04N 21/25891 725/32 |
| 2013/0039542 A1 | 2/2013 | Guzik | |
| 2014/0082091 A1 | 3/2014 | Rexer | |
| 2014/0122657 A1 | 5/2014 | Crawley et al. | |

FOREIGN PATENT DOCUMENTS

| | | |
|---|---|---|
| JP | 2007-88943 A | 4/2007 |
| JP | 2007-201862 A | 8/2007 |
| JP | 2011-78008 A | 4/2011 |
| KR | 10-1352203 B1 | 1/2014 |
| WO | 2013/059301 A1 | 4/2013 |

* cited by examiner

USER JOHN — PURE SPEECH ♪ ✓

USER TOM — NOISY SPEECH ♪ ✗

USER SAM — NOISY SPEECH ♪ ✗

FIG. 14A
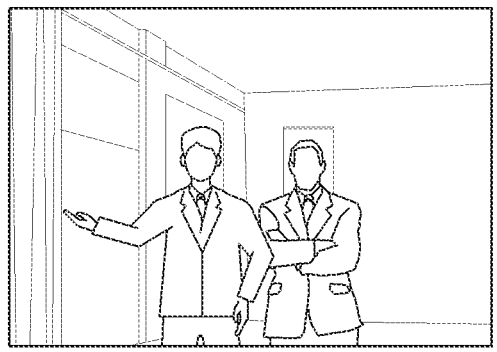
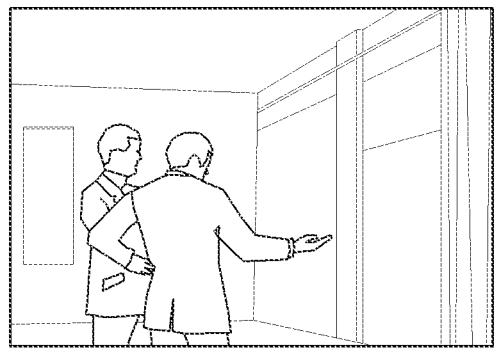

ELECTRONIC DEVICE, CONTROL METHOD THEREOF AND SYSTEM

CROSS-REFERENCE TO RELATED APPLICATION(S)

This application claims the benefit under 35 U.S.C. §119 (a) of an Indian patent application filed on Jun. 6, 2014 in the Indian Intellectual Property Office and assigned Serial number 2798/CHE/2014, and of a Korean patent application filed on Apr. 23, 2015 in the Korean Intellectual Property Office and assigned Serial number 10-2015-0057268, the entire disclosure of each of which is hereby incorporated by reference.

TECHNICAL FIELD

The present disclosure relates to multimedia systems. More particularly, the present disclosure relates to a method and system for collaboratively recording and summarizing an event by analyzing metadata received from a plurality of electronic devices.

BACKGROUND

With the ever increasing capabilities of mobile devices with respect to producing multimedia especially videos, it is likely that the amount of user created video content will explode. Most of events such as dramatic events, natural disaster events, newsworthy events, and the like highlight the ubiquity of cell phone cameras to routinely document seemingly ordinary, mundane, and spiritual occurrences.

A typical content collaboration scenario to create such video recordings involves a group of users operating one or more cameras to record the various scenes, shots, and the like of an event. The recorded video content is streamed from the various cameras and is then received at a single point. Then the video content is (manually or automatically) edited and combined to provide a resultant multimedia video.

All of the users in the group need to share the entire video content streams to create the resultant multimedia file. As the same event is captured by the users, there is a probability to repeat the same scenes, shots, or the like of the same event. Further, a collaborator may not consider some of the recorded video segments to be useful enough in terms of the content data quality, redundancy, and the like to consider in the resultant multimedia file.

In some situations, some of video content is useful due to its immediate relevancy, and quickly becomes too old. Furthermore, the sharing or uploading of actual video segment may be time and bandwidth consuming which significantly increases overall system cost both from sending and receiving ends. Thus, an easier way is needed to manage the various aspects of gathering, classifying, managing, and fetching the video content streams in the collaborative environment.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a system and method for coordinating a multimedia recording in a collaborative environment.

Another aspect of the present disclosure is to provide a mechanism where metadata generated on an electronic device is shared with a plurality of other electronic devices participating in the multimedia recording session in real-time and offline.

Another aspect of the present disclosure is to provide a mechanism to automatically identify interesting video segments or images in the multimedia streams in order to compose a resultant multimedia file based on an analysis of metadata received from a plurality of electronic devices.

Another aspect of the present disclosure is to provide a mechanism to identify multimedia streams desired by the user to create a resultant multimedia summary video file based on an analysis of metadata received from a plurality of electronic devices.

Another aspect of the present disclosure is to provide a mechanism to fetch the selected interesting video segments or images in the multimedia streams based on an analysis of metadata received from a plurality of electronic devices.

Another aspect of the present disclosure is to provide a mechanism to generate and share thumbnails associated with recorded multimedia streams periodically based on an analysis of metadata received from a plurality of electronic devices. The thumbnail is a representative image which can represent an entire scene which is being recorded. This representative thumbnail enables each user to view what other users are recording in the session.

Another aspect of the present disclosure is to provide a mechanism to generate a visual layout indicating a location of the plurality of electronic devices based on an analysis of metadata received from a plurality of electronic devices. The visual layout indicates for example, the electronic devices participating in multimedia recording of an event, a location of an important event in the collaborative environment, a location of one or more users in the collaborative environment, a proximity of two electronic devices in the collaborative environment, or the like.

Another aspect of the present disclosure is to provide a mechanism to alert one or more electronic devices recording scenes which visually appear to be similar of an event based an analysis of metadata received from the electronic devices.

Another aspect of the present disclosure is to provide a mechanism to create collages of multimedia content based an analysis of metadata received from a plurality of electronic devices.

Another aspect of the present disclosure is to provide a mechanism to automatically suggest a theme for multimedia content based on an analysis of metadata received from a plurality of electronic devices.

In accordance with an aspect of the present disclosure a method of a first device is provided. The method includes recording, by the first electronic device, a first multimedia stream, generating a first metadata associated with the first multimedia stream, receiving at least one second metadata associated with a second multimedia stream recorded by at least one second electronic device, and generating a final multimedia file based on an analysis the first metadata and the at least one second metadata.

In accordance with an aspect of the present disclosure a first electronic device configured to perform multimedia recording is provided. The first electronic device includes a communicator configured to communicate with at least one second electronic device, and a processor configured to record a first multimedia stream, to generate a first metadata associated with the first multimedia stream, to receive at least one second metadata associated with a second multimedia stream recorded by the at least one second electronic device, and to, based on an analysis of the first metadata and the at least one second metadata, generate a final multimedia file.

In accordance with an aspect of the present disclosure, a system for performing multimedia recording is provided. The system includes a first electronic device configured to record a first multimedia stream and to generate a first metadata associated with the first multimedia stream. Further, the system includes at least one second electronic device configured to record a second multimedia stream, wherein the first electronic device is further configured to receive at least one second metadata associated with the second multimedia stream recorded by at least one second electronic device, and to, based on an analysis of the first metadata and the at least one second metadata, generate a final multimedia file.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with reference to the drawings, in which:

FIGS. 14A, 14B, and 14C are example illustrations showing final video snapshots of an office event in a collaborative recording environment according to various embodiments of the present disclosure;

Throughout the drawings, it should be noted that like reference numbers are used to depict the same or similar elements, features, and structures.

DETAILED DESCRIPTION

Figure 1:
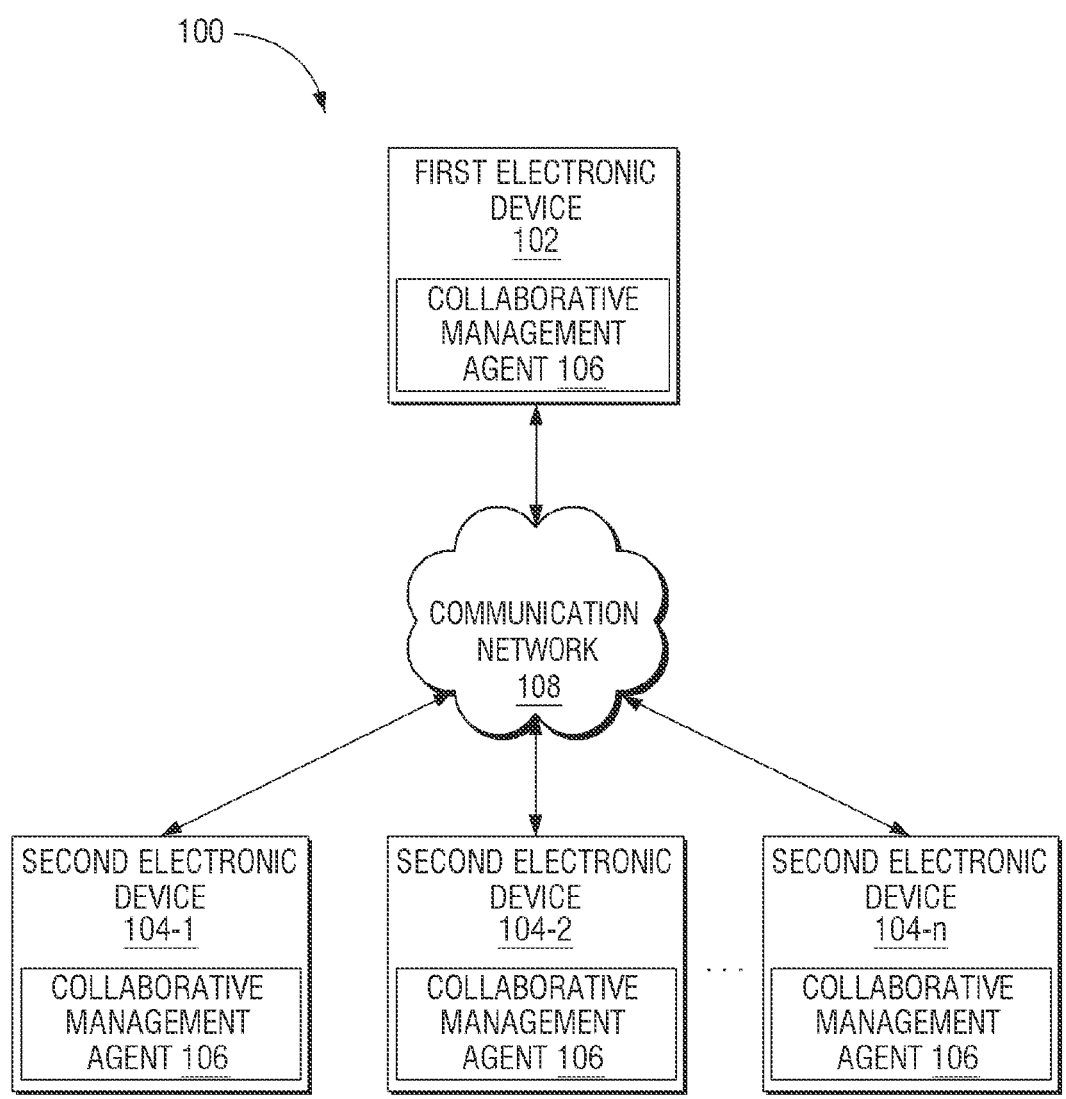
FIG. 1 illustrates a high level overview of a system for coordinating a multimedia recording in a collaborative environment according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Embodiments described herein achieve a system and a method for coordinating a multimedia recording in a collaborative environment. The method includes receiving, by a first electronic device, a first metadata associated with a first multimedia stream recorded. The method includes receiving, by the first electronic device at least one second metadata associated with a second multimedia stream recorded by at least one second electronic device. Further, the method includes composing, by the first electronic device, a resultant multimedia file based on the first metadata and the at least one second metadata.

The method and system described herein is simple and robust for coordinating a multimedia recording in the collaborative environment. Unlike related systems, instead of sharing the actual multimedia streams, only the metadata associated with the recorded streams from respective electronic devices are shared with a collaborator in the collaborative environment. The metadata received from the various electronic devices are analyzed to compose the resultant multimedia file at electronic device. Based on the analysis of the received metadata, a resultant metadata file is created which contains information of interesting video segments or images in the multimedia streams recorded during the multimedia recording session. Based on the resultant metadata file, the associated second multimedia streams or portions of the associated second multimedia streams can be fetched from the respective electronic devices. As only few identified multimedia streams are fetched based on the resultant metadata file, there is no need to fetch all the multimedia streams from the electronic devices. This saves the time and bandwidth in the collaborative environment thereby, significantly reducing the overall system cost at both the sender and receiver end.

FIGS. 1 through 16, discussed below, and the various embodiments used to describe the principles of the present disclosure in this patent document are by way of illustration only and should not be construed in any way that would limit the scope of the disclosure. Those skilled in the art will understand that the principles of the present disclosure may be implemented in any suitably arranged communications system. The terms used to describe various embodiments are exemplary. It should be understood that these are provided to merely aid the understanding of the description, and that their use and definitions in no way limit the scope of the present disclosure. Terms first, second, and the like are used to differentiate between objects having the same terminology and are in no way intended to represent a chronological order, unless where explicitly stated otherwise. A set is defined as a non-empty set including at least one element FIG. 1 illustrates a high level overview of a system for coordinating a multimedia recording in a collaborative environment according to an embodiment of the present disclosure.

Referring to FIG. 1, a system 100 is illustrated, where the system 100 includes a first electronic device 102 and a plurality of second electronic devices 104-1, 104-2 to 104-N (hereafter referred as second electronic device(s) 104) communicating with each other over a communication network 108.

In an embodiment, the first electronic device 102 and the second electronic device 104 described herein can be for example, but are not limited to, a cell phone, a personal digital assistant (PDA), a mobile, a personal computer, a laptop, a tablet, a phablet, a desktop computer, a communicator, wearable device or an equivalent thereof.

The first electronic device 102 and the second electronic device 104 can collaboratively record an event of interest. In an embodiment, the event may, non-exclusively, refer to seemingly ordinary, mundane, and spiritual occurrences. An example of events can include, but is not limited to, dramatic events, natural disaster events, newsworthy events, spiritual events, or the like.

The first electronic device 102 and the second electronic device 104 can be configured to include a collaborative management agent 106 to manage the collaborative multimedia recording. The collaborative management agent 106 can be configured to provide a user interface to engage the first electronic device 102 and the second electronic devices 104 to communicate with each other, such as to form a collaborative event. A collaborative session can be created to allow the first electronic device 102 and the second electronic devices 104 to document seemingly ordinary, mundane, and spiritual events in the collaborative environment.

The collaborative management agent 106 in the first electronic device 102 can be configured to generate a first multimedia stream of an event and corresponding first metadata associated with the first multimedia stream. Similarly, the collaborative management agent 106 in the second electronic device 104 can be configured to generate a second multimedia stream and corresponding second metadata associated with the second multimedia stream. In an embodiment, the metadata described herein can include for example, but is not limited to, camera settings, time stamps, emotion detection, face detection and recognition, audio detection and classification, motion detection, blur detection, hand shake detection, feature extraction, location information, object information, human detection, behavior detection, object detection and recognition information, image quality detection and feature detection, and the like.

In an embodiment, the first multimedia stream recorded in the first electronic device 102 and the second multimedia stream recorded in the second electronic device 104 can be related to visually similar scene. In an embodiment, the first multimedia stream recorded in the first electronic device 102 and the second multimedia stream recorded in the second electronic device 104 can be related to different scenes.

Further, each of the second electronic devices 104 can be configured to send the second metadata associated with the second multimedia stream to the first electronic device 102. In an embodiment, the second electronic devices 104 can be configured to send the second metadata associated with the second multimedia stream to the first electronic device 102 in real time, i.e. during recording. In an embodiment, the second electronic devices 104 can be configured to send the second metadata associated with the second multimedia stream to the first electronic device 102, offline i.e. after recording is complete.

Although FIG. 1 illustrates the first electronic device 102 coordinating the collaborative recording session in which the plurality of second electronic devices 104 are participating, it must be understood that the first electronic device 102 and the second electronic device 104 are for illustration purposes, any of the second electronic device 102 can coordinate the recording session, i.e. act as the first electronic device 102.

The communication network 108 can be configured to support the multimedia recording in the collaborative environment. In an embodiment, the communication network 108 described herein can be for example, but is not limited to, Personal Area Networks (PANs), Local Area Networks (LANs), Wide Area Networks (WANs), Global System for Mobile Communication (GSM), Internet, value-added networks, wireless communications networks, two-way cable networks, satellite networks, interactive kiosk networks, cellular networks, Personal Mobile Gateways (PMGs), short distance communication networks like Bluetooth, Near Field Communication (NFC) or any other suitable communications networks that can provide a means of communication between the electronic devices.

FIG. 1 illustrates a limited overview of the system 100 but it is to be understood that other embodiments are not limited thereto. It should be understood that the labels first and second are only for illustrative purpose and does not limit the scope of the present disclosure. In some of the embodiment, at a given time, the first electronic device can act as second electronic device and vice versa. Further, in some embodiments, the first and second electronic devices 102 and 104 can refer to a same electronic device.

Further, the system 100 can include various other electronic devices along with other hardware or software components, communicating locally or remotely to coordinate the multimedia recording in the collaborative environment. For example, the component can be, but not limited to, a process running in the controller or processor, an object, an executable process, a thread of execution, a program, or a computer. By way of illustration, both an application running on an electronic device and the electronic device itself can be a component.

Figure 2:
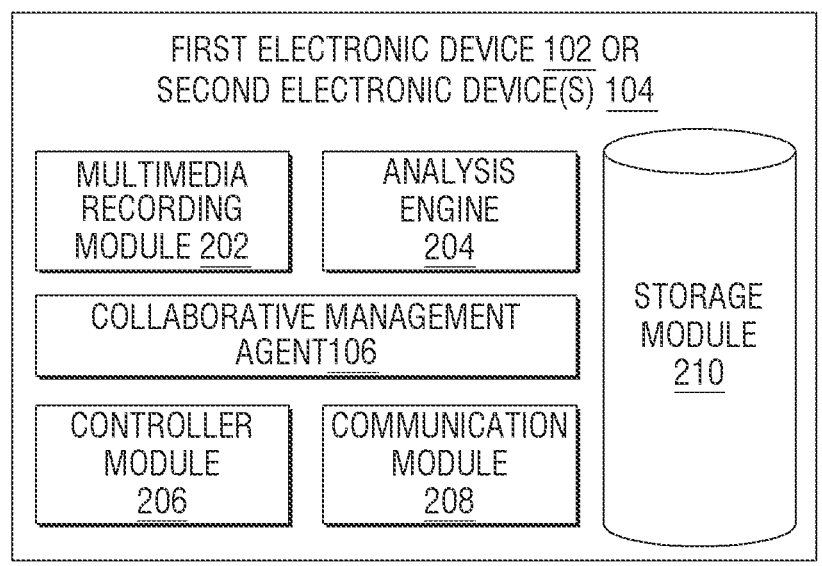
FIG. 2 illustrates various modules in a first electronic device or a second electronic device configured to coordinate a multimedia recording in a collaborative environment according to an embodiment of the present disclosure.

FIG. 2 illustrates various modules in a first electronic device or a second electronic device configured to coordinate a multimedia recording in a collaborative environment according to an embodiment of the present disclosure.

Referring to FIG. 2, a first electronic device 102 and/or a second electronic device 104 are illustrated, where the first electronic device 102 and the second electronic device 104 can be configured to include a multimedia-recording module 202, an analysis engine 204, a controller module 206, a communication module 208, a storage module 210, and the collaborative management agent 106.

Figure 4A:
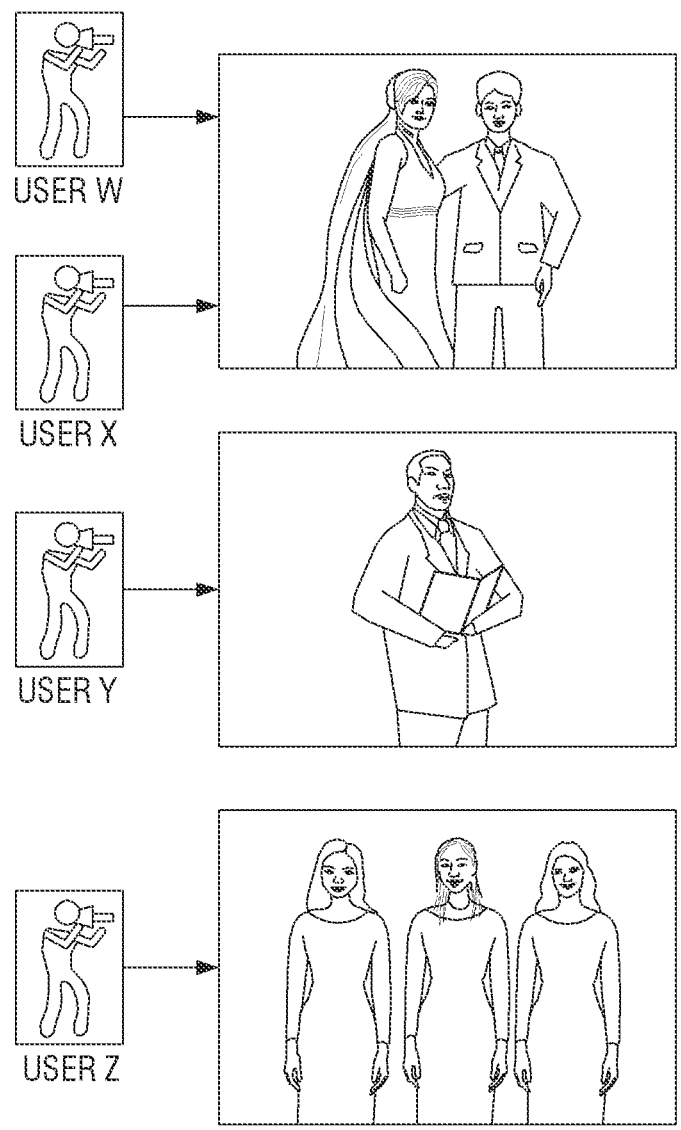
FIGS. 4A and 4B are example illustrations showing a group of users capturing an event in a collaborative environment according to various embodiments of the present disclosure.
Figure 4B:
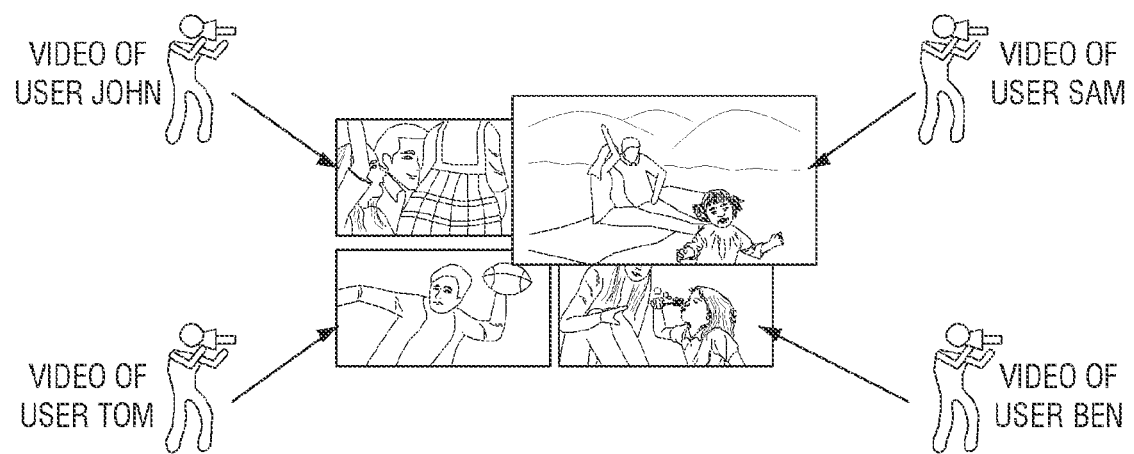

The multimedia recording module 202 can be configured to record an event. Illustrations in FIGS. 4A and 4B show examples of events being collaboratively recorded by a plurality of electronic devices in a multimedia recording session. The collaborative management agent 106 can initiate the multimedia recording in the collaborative environment. The communication module 208 can be configured to discover a plurality of the second electronic devices 104 in the vicinity of the first electronic device 102. Based on the discovered second electronic devices 104, the collaborative management agent 106 can be configured to send an invitation to the second electronic devices 104. For example, to participate in the multimedia recording in the collaborative environment, the invite is received at the second electronic devices 104. On accepting the received invitation, the second electronic device 104 and the first electronic device 102 can start the collaborative session.

The multimedia recording module 202 in the first electronic device 102 generates a first multimedia stream for a recorded event. The collaborative management agent 106 generates the corresponding first metadata associated with the first multimedia stream. Each second electronic device 104 can be configured to generate a second multimedia stream. The collaborative management agent 106 generates the corresponding second metadata associated with the second multimedia stream. The generated first multimedia stream and the plurality of second multimedia stream are stored in the storage module 210 of the respective first electronic device 102 and the second electronic device 104. Each of the second electronic devices 104 can be configured to send the second metadata to the first electronic device and vice versa 102.

The analysis engine 204 can be configured to analyze the received first metadata and the received second metadata at the first electronic device and vice versa 102. The collaborative management agent 106 can be configured to compose a resultant multimedia file at the electronic device based on the analysis of the received metadata performed by the analysis engine 204.

In an embodiment, the collaborative management agent 106 can be configured to combine at least one portion of the first multimedia stream and at least one portion of the second multimedia stream to generate the resultant multimedia file at the first electronic device 102. The user of the first electronic device 102 can specify filters for the first metadata and the second metadata to select the portions of first multimedia stream and the second multimedia stream.

In an embodiment, the collaborative management agent 106 can be configured to generate a resultant metadata file from the analyzed first metadata and the second metadata. Based on the generated resultant metadata file, the collaborative management agent 106 can be configured to fetch the portions of the multimedia stream including the selected interesting video segments or images from the second electronic device 104 corresponding to the selected portions for generating a multimedia recording.

The resultant metadata file can be created at the first electronic device 102 based on a plurality of user defined attributes. The resultant metadata file can be used by the collaborative management agent 106 to fetch the corresponding multimedia stream from the corresponding second electronic device 104. Examples of user defined attributes used for filtering, can include, but are not limited to, events, people, scenery, pets, vehicles, thumbnails of second users selected by the user, camera settings, redundancies, durations of the recordings, and timestamps.

The users of the first electronic device 102 or the second electronic device 104 can exit the collaborative multimedia recording environment, and generate their multimedia recording by generating the resultant metadata file and fetching the portions of the multimedia stream to generate a multimedia recording. In an embodiment, the resultant metadata file can be generated by automatically selecting the interesting video segments or images in the multimedia streams.

In an embodiment, the collaborative management agent 106 can be configured to share a low resolution thumbnail of the recorded multimedia streams based on the analysis of the first metadata and the second metadata performed by the analysis engine 204. For example, the thumbnail can depict the best representative image of the multimedia stream to show the highlight of recording every few minutes. The communication module 208 in the first electronic device 102 and the second electronic 104 can be configured to share the important representative thumbnails with each other periodically. This representative thumbnail enables the user of the first electronic device 102 to view what other users of the second electronic device 102 are recording in the collaborative recording session.

In an embodiment, the analysis engine 204 can be configured to determine if the scene captured by the first electronic device 102 is visually similar to the scene captured by the second electronic device 104 by comparing the first metadata and the second metadata. Based on analysis of the first metadata and the second metadata, if the scene captured by the first electronic device 102 appears visually similar to the scene captured by the second electronic device 104, the collaborative management agent 106 can be configured to send an alert to the user of the second electronic device 104. The alert can inform the user of the second electronic device 104 that the first electronic device 102 is capturing the visually similar scene. For example, a buzz created by the collaborative management agent 106 can alert the user that the visually similar scene is being captured by another user. Unlike related systems, the alert from the first electronic device 102 promotes the redundancy detection in the system by identifying similar multimedia streams by the analysis of the metadata associated with the first multimedia stream and the second multimedia stream.

In an embodiment, the collaborative management agent 106 can be configured to generate at the first electronic device 102, a visual layout indicating the location of the first electronic device 102 and a plurality of second electronic devices 104 based on an identified popularity of one of the second metadata. The popularity of the second metadata can be used for identifying important events recorded by the plurality of the second electronic devices 104.

In an embodiment, pre-defined attributes related to audio and visual cues in the first metadata and the second metadata can be used for identifying important events in the recorded multimedia streams. Examples of pre-defined attributes can include, but are not limited to, loud clapping, movement of objects in the thumbnails towards same direction, cheering, a user density layout, and an outburst of laughter.

In an embodiment, the collaborative management agent 106 can be configured to generate a visual layout indicating the user density in the collaborative multimedia recording environment. For example, the collaborative management agent 106 in the first electronic device 102 can display the user density layout of a wedding event. From the density layout, the user of the first electronic device 102 can identify that several second electronic devices 104 are recording a wedding ceremony event being performed on the stage. The first electronic device 102 can stop recording the event of stage and capture another scene in the wedding event. This can prevent redundant video scenes from being recorded during the collaborative recording session. Thus the resultant multimedia video does not include the same scene captured by two or more electronic devices. In another embodiment the user density information can be used to draw the attention of inactive users. A high user density in a given location may mean that some important event is occurring.

The controller module 206 can be configured to coordinate the operations performed by different modules and assist the collaborative management module 106 in the multimedia recording.

FIG. 2 illustrates a limited overview of the modules of the first electronic device 102 or the second electronic device 104 but it is to be understood that other embodiments are not limited thereto. The labels or names of the modules are used only for the illustrative purpose and does not limit the scope of the present disclosure. Further, in real-time the function of the one or more modules can be combined or separately executed by the same or other modules without departing from the scope of the embodiments described herein. Further, the electronic devices 102 and/or 104 can include various other modules along with other hardware or software components, communicating locally or remotely to coordinate the multimedia recording in the collaborative environment. For example, the component can be, but not limited to, a process running in the controller or processor, an object, an executable process, a thread of execution, a program, or a computer. By way of illustration, both an application running on an electronic device and the electronic device itself can be a component.

Figure 3:
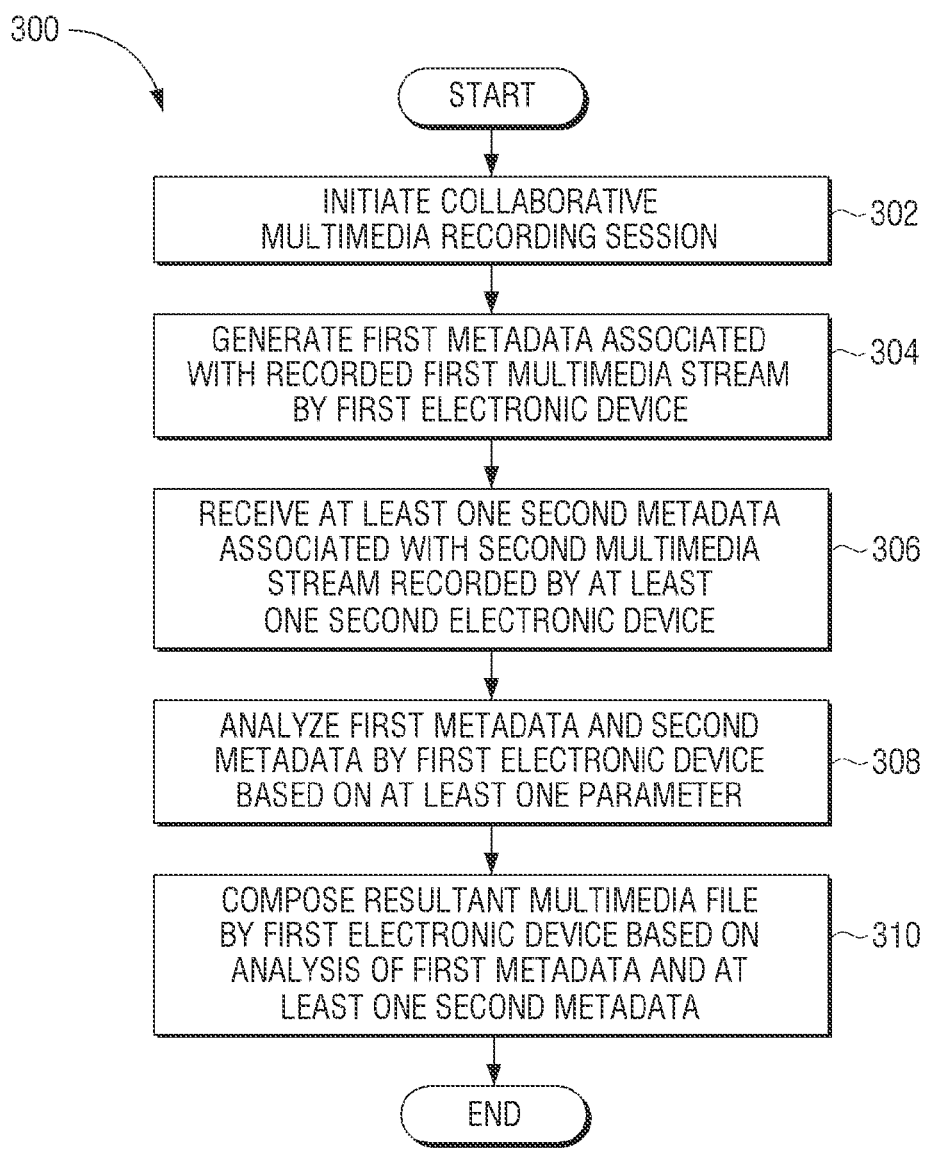
FIG. 3 is a flowchart illustrating a method for coordinating a multimedia recording in a collaborative environment according to an embodiment of the present disclosure.

FIG. 3 is a flowchart illustrating a method for coordinating a multimedia recording in a collaborative environment according to an embodiment of the present disclosure.

Referring to FIG. 3, a method 300 is illustrated, wherein various steps of the method 300 are summarized into individual blocks where some of the steps are performed by the first electronic device 102, as illustrated in FIG. 2, the second electronic device 104, as illustrated in FIG. 2, the user of the first electronic device 102, the user of the second electronic device 104, and a combination thereof. The method 300 and other description described herein provide a basis for a control program, which can be implemented using a microcontroller, microprocessor, or any computer readable storage medium.

At operation 302, the method 300 includes initiating a collaborative multimedia recording session. The method 300 allows the collaborative management agent 106, as illustrated in FIG. 2, of the first electronic device 102 to initiate the collaborative recording session by inviting one or more second electronic devices 104 to join the collaborative recording session. The invitations can be sent from the collaborative management agent 106 of the first electronic device 102 to the plurality of second electronic devices 104 using the collaborative management agent 106 via the communication network 108, as illustrated in FIG. 1.

In an embodiment, the second electronic devices 104 can discover active collaborative recording session using the collaborative management agent 106 and join the active collaborative recording session after authentication from the user of the first electronic device 102. The user of the first electronic device 102 created the collaborative recording session and coordinates the recording session of an event.

At operation 304, the method 300 includes receiving, by the first electronic device 102, a first metadata associated with the first multimedia stream recorded. The method 300 allows the analysis engine 204, as illustrated in FIG. 2, to generate a first metadata associated with the recorded first multimedia stream. In the first electronic device 102, the first metadata is generated for the recorded first multimedia stream. The method 300 allows the controller module 206, as illustrated in FIG. 2, to receive an update of the generated first metadata, which is stored in the storage module 210, as illustrated in FIG. 2.

At operation 306, the method 300 includes receiving at least one second metadata associated with the second multimedia stream recorded by the at least one second electronic device 104. The method 300 allows the collaborative management agent 106 to send the generated plurality of second metadata to the first electronic device 102 and vice versa.

At operation 308, the method 300 includes analyzing the first metadata and the second metadata based on at least one parameter. Examples of the at least one parameter can include, but are not limited to camera settings, time stamps, emotion detection, face detection and recognition, audio detection and classification, motion detection, blur detection, hand shake detection, feature extraction, location information, important event detection, redundancy detection, object information, zoom detection, camera focus, human detection, behavior detection, image quality detection, object detection and recognition information.

At operation 310, the method 300 includes composing the resultant multimedia file based on the analysis of the first metadata and the second metadata. The method 300 allows the collaborative management agent 106 to perform various actions based on the results of the analysis engine 204.

At operation 310, the method 300 includes combining at least one portion of the first multimedia stream and at least one portion of the second multimedia stream to generate the resultant multimedia file at the first electronic device 102. In an embodiment, the collaborative management agent 106 can be configured to automatically identify interesting video segments or images in the multimedia streams in order to create the resultant multimedia file. In an embodiment, the resultant multimedia file is a composite summary video file based on an analysis of the metadata received from the first electronic device 102 and the metadata received from the second electronic device 104.

In an embodiment, the user of the first electronic device 102 can specify attributes as filters for the first metadata and the second metadata to select the portions of the first multimedia stream and the second multimedia stream. Examples of attributes used for filtering, can include, but are not limited to, event, people, scenery, pets, vehicle, thumbnails of second users located by the user, camera settings, redundancy, duration of the recording, and timestamps.

In an embodiment, on exiting the collaborative session, the method 300 allows the collaborative management agent 106 to generate the resultant metadata file from the analyzed first metadata and the second metadata. Based on the generated resultant metadata file, the first electronic device 102 can be configured to fetch the portions of the multimedia stream including the selected interesting video segments or images to generate the multimedia recording. Unlike related systems, the method 300 allows the generation of the resultant metadata file based on the user specified parameters and the metadata analysis. This allows the first electronic device 102 to generate a quality multimedia recording in the collaborative environment. For example, based on the parameters like camera settings, audio quality levels, image resolution levels, and focus settings, video quality, video redundancy, video scenes from different perspectives, and the best quality video segments can be fetched from the second electronic device 104. Further, as only selected second multimedia stream or portions of the second multimedia streams are fetched, the time and bandwidth consumption can be minimized thereby, significantly reducing overall collaborative system cost.

In an embodiment, the selected second multimedia stream or selected portions of the second multimedia streams can be transcoded to a low resolution format to reduce a file transfer time between the second electronic device 104 and the first electronic device 102.

In an embodiment, the selected multimedia stream or selected portions of the multimedia streams can be transcoded to a low resolution format, when the first electronic device 102 lacks the capability to handle a high resolution multimedia.

In another example, the collaborative management agent 106 in the first electronic device 102 can fetch multimedia streams from the second electronic device 104 based on the plurality of second metadata's received from the second electronic device(s) 104, when the first electronic device 102 has missed some interesting scenes in an event based on the metadata analysis.

Figure 7:
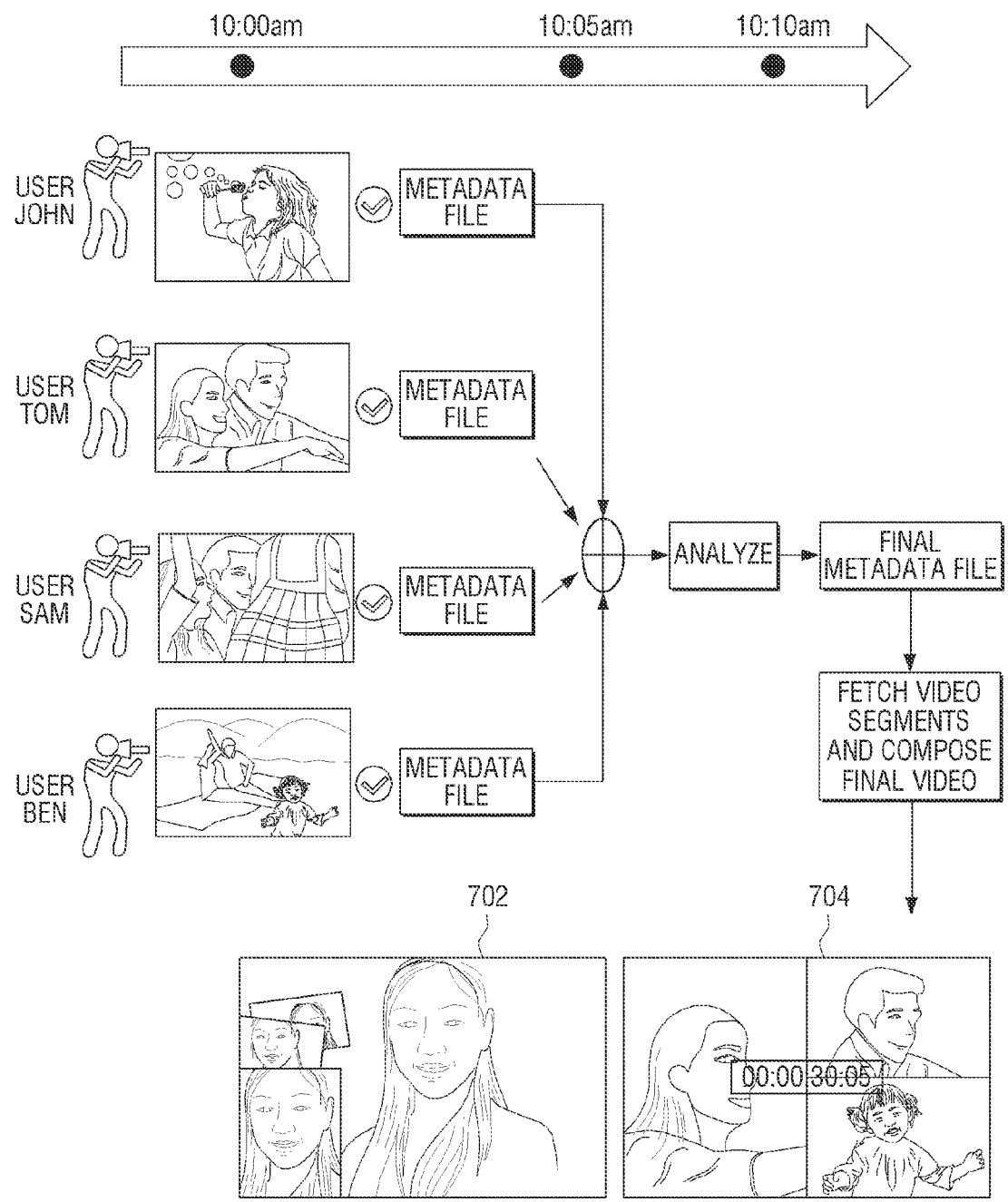
FIG. 7 shows an example scenario for composing a final summary video file based on an analysis of metadata received from a plurality of electronic devices in a collaborative environment according to an embodiment of the present disclosure.
Figure 8:
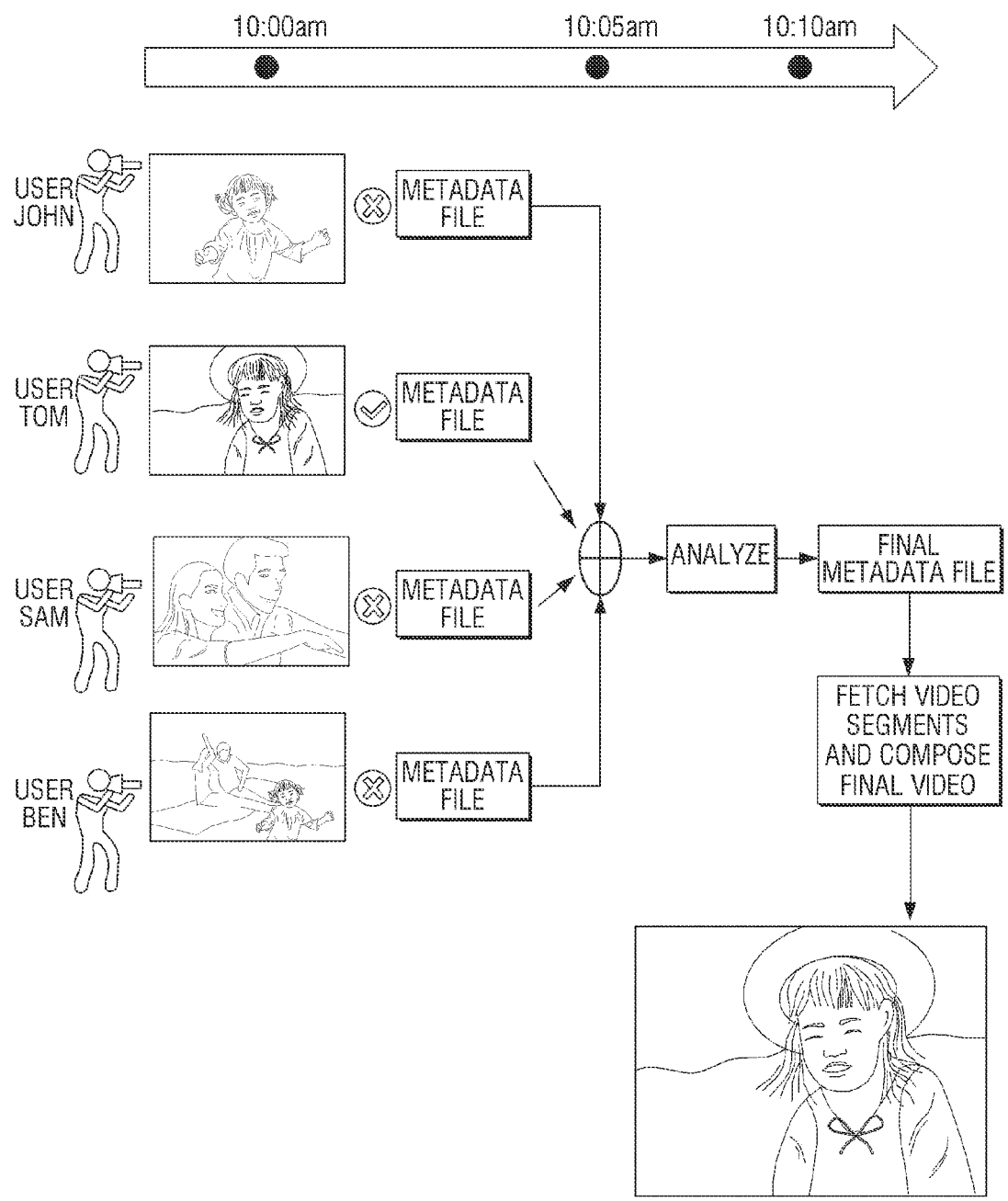
FIG. 8 shows an example scenario for composing a resultant summary video file by discarding blurred multimedia stream based on an analysis of metadata received from a plurality of electronic devices in a collaborative environment according to an embodiment of the present disclosure.

An example illustration, depicting the combining of different portions of the multimedia streams based on the resultant metadata file is shown in conjunction with FIGS. 7 and 8.

At operation 310, the method 300 allows the collaborative management agent 106 to send an alert message to the second electronic device 104 using the collaborative management agent 106, if the scene captured by the first electronic device 102 appears visually similar as the one being captured by the second electronic device 104. The alert can inform the user of the second electronic device 104 that the first electronic device 102 is capturing the visually similar scene. For example, a buzz created using by the collaborative management agent 106 can alert the user of the second electronic device 104 that another user is capturing the visually similar scene. The user of the second electronic device 104 can either continue recording the same scene or capture another scene. Hence, the overall redundancy in the collaborative recording session can be reduced by avoiding the capture of visually similar scenes by the second electronic devices 104. Unlike related systems, the alert system may allow users to capture different scenes in an event and combine them to create a resultant summarized multimedia recording covering different scenes of the event.

Figure 6:
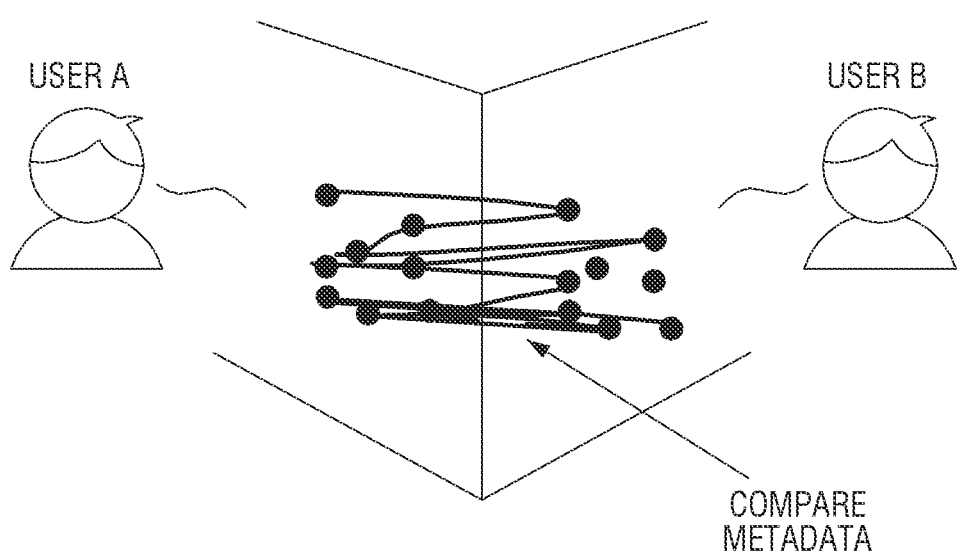
FIG. 6 is an example illustration showing a comparison of image features in metadata received from user A and user B according to an embodiment of the present disclosure.

An example illustration, depicting the capturing of same scene by the first electronic device 102 and the second electronic device 104 is shown in conjunction with FIG. 6.

At operation 310, the method 300 includes sharing the low resolution thumbnail of the recorded first multimedia stream based on the analysis of the first metadata and the second metadata performed by the analysis engine 204. The low resolution thumbnail shows a representation in the form of a small low resolution video to highlight a best capture of events recorded in the past few minutes of the collaborative session. In an embodiment the thumbnail is a representative image of a particular frame in the recorded multimedia stream. The first electronic device 102 and the second electronic device(s) 104 can share the low resolution thumbnail using the communication network 108. The users can press a select option on viewing the thumbnail received from a second electronic device 104, when the user likes the quality of the video or image in thumbnail. Based on the thumbnail selection the first electronic device 102 can import camera settings used by the second electronic device 104. In an embodiment, based on a user gesture, the camera setting from the second electronic device 104 can be imported to the first electronic device 102.

In an embodiment, the collaborative management agent 106 can provide a group forum where the users of the first electronic device 102 and the second electronic device(s) 104 can add comments, emoticons, and annotations for the low resolution representative thumbnails displayed by the collaborative management agent 106. This makes the collaborative recording session interesting to users who are not active (i.e., the second electronic devices 104 are passive and not recording the event), but are interested in viewing the activities happening during the collaborative recording session of the event.

At operation 310, the method 300 allows the controller module 206 to generate a visual layout indicating the location of the first electronic device 102 and the plurality of second electronic devices 104 based on the identified popularity of one of the second metadata. The popularity of the second metadata can be used for identifying important events recorded by the plurality of the second electronic devices 104.

Based on the visual layout and analysis of the first metadata and the second metadata, the collaborative management agent 106 can identify an inactive second electronic device 104. An inactive second electronic device 104 is not recording any multimedia in the collaborative session. When an important event has been identified, and some of the users in the collaborative session are inactive, the collaborative management agent 106 can be configured to inform the idle users of the important event. For example, a message with a buzz can be sent to the inactive second electronic devices 104, when idle.

The various actions, acts, blocks, steps, and the like in the method 300 may be performed in the order presented, in a different order or simultaneously. Further, in some embodiments, some actions, acts, blocks, steps, and the like may be omitted, added, modified, skipped, and the like without departing from the scope of the present disclosure.

FIGS. 4A and 4B are example illustrations showing a group of users capturing an event in a collaborative environment according to various embodiments of the present disclosure.

Referring to FIG. 4A, an example of a wedding event captured in the collaborative environment is illustrated. For example, an electronic device of user X and an electronic device of user W are recording a same scene including a bride and groom. An electronic device of user Y is recording a Pastor who is formalizing a wedding ceremony. An electronic device of user Z is recording bridesmaids in the wedding event. Each of these users of the electronic devices can exit or preview a collaborative recording session as per preference. The event is captured by the electronic devices of users X, W, Y and Z and includes multimedia streams which are time overlapped, which allows the wedding ceremony to be captured from different perspectives. The metadata associated with the recorded multimedia streams are shared between the electronic devices.

Referring to FIG. 4B, an example of a family picnic event captured by four users, is illustrated. FIG. 4B gives an illustration of a resultant composite video file with graphical effects using multimedia streams recorded by electronic devices of users John, Tom, Sam, and Ben. The multimedia streams recorded at the electronic devices of John, Tom, Sam and Ben capture different scenes in the family picnic event. Based on metadata analysis of the captured multimedia streams, the interesting video segments can be identified and composed into the resultant composite video file.

Figure 5A:
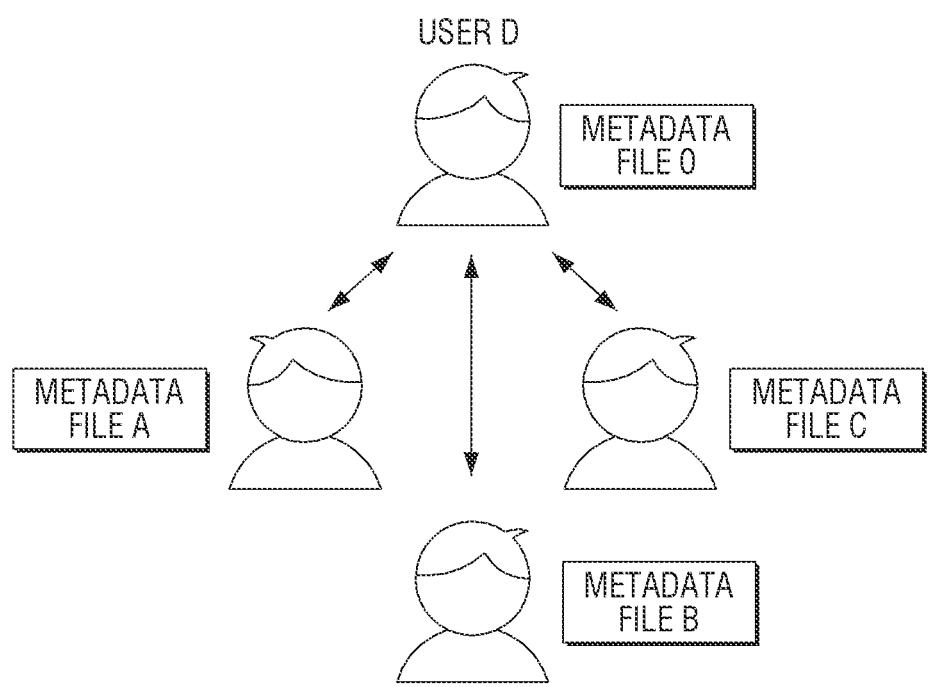
FIGS. 5A, 5B, and 5C are example illustrations of analyzing metadata received from various electronic devices and creating a resultant multimedia summary video file in a collaborative environment according to various embodiments of the present disclosure.
Figure 5B:
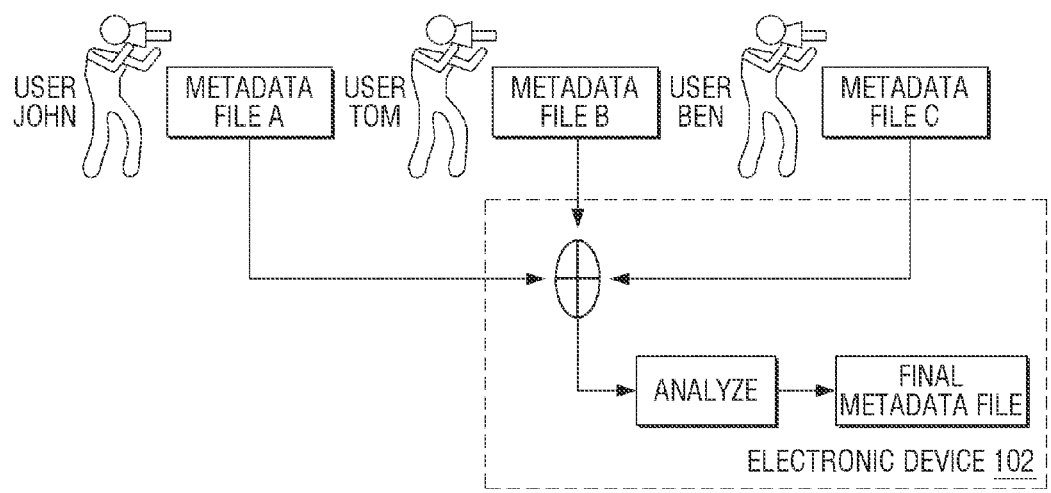
Figure 5C:
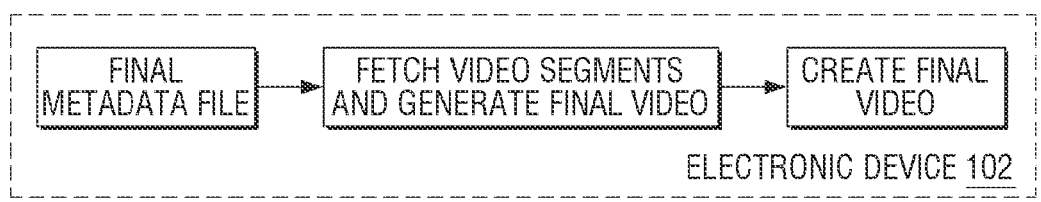

FIGS. 5A, 5B, and 5C are example illustrations of analyzing metadata received from various electronic devices and creating a resultant composite summary video file in a collaborative environment according to various embodiments of the present disclosure.

Referring to FIG. 5A, metadata files O, A, B, C and D are illustrated, where the metadata files O, A, B, C and D may be generated by second electronic devices 104 and/or the first electronic device 102, as illustrated in FIG. 2, of different users. The electronic device of user D can be configured to act as the first electronic device 102. The first electronic device 102 associated with user D generates the (first) metadata file O (own) and receives a plurality of (second) metadata files A, B, and C from the second electronic devices 104.

Referring to FIG. 5B, a plurality of second metadata files A, B and C are illustrated, where the second metadata files A, B and C may be received at the first electronic device 102, as illustrated in FIG. 2, from the second electronic devices 104, as illustrated in FIG. 2, associated with users John, Tom and Ben. The first electronic device 102 analyses first metadata and the received second metadata and generates a resultant metadata file.

Referring to FIG. 5C, a generation of a composite video file using a resultant (final) metadata file is illustrated, where the composite (final) video file is created by the electronic device, as illustrated in FIG. 2. Based on the generated resultant (final) metadata file, the collaborative management agent 106, as illustrated in FIG. 2, fetches the video segments or a portion of video segments from the second electronic device 104 and the electronic device 102 creates the resultant (final) video.

FIG. 6 is an example illustration showing a comparison of image features in metadata received from user A and user B according to an embodiment of the present disclosure.

Referring to FIG. 6, a comparison between metadata received from user A and metadata received from user B is illustrated, where the comparison allows the analysis engine 204, as illustrated in FIG. 2, to determine how visually similar the recorded multimedia stream of user A and user B is. User A can be the first electronic device 102, as illustrated in FIG. 2, and user B can be the second electronic device 104, as illustrated in FIG. 2.

FIG. 6 shows a comparison performed between the first metadata and the second metadata associated with the recorded multimedia streams received from the first electronic device 102 and the second electronic device 104. In an embodiment, the analysis engine 204 can be configured to perform metadata mapping to determine if the same multimedia stream i.e. visually similar multimedia streams has been recorded in the first electronic device 102 of user A and the second electronic device 104 of user B. The use of metadata mapping allows redundancy detection in the collaborative session. The collaborative management agent 106 in the first electronic device 102 can send an alert to user B informing that the first electronic device 102 is capturing the same scene.

FIG. 7 shows an example scenario for composing a resultant summary video file based on an analysis of metadata received from a plurality of electronic devices in a collaborative environment according to an embodiment of the present disclosure.

Referring to FIG. 7 a picnic event is illustrated, where the picnic event is collaboratively recorded by electronic devices of four users John, Tom, Sam and Ben.

A metadata file is created and updated at each electronic device periodically for the recorded multimedia stream. The generated metadata and a periodic representative thumbnail associated with the recorded multimedia stream are shared between the electronic devices during the collaborative recording session. Any of the electronic devices can exit the collaborative session and analyze the received metadata and compose a resultant metadata file. The collaborative management agent 106, as illustrated in FIG. 2, can compose the resultant metadata file by analyzing various parameters in the received metadata to select the best video segments, and best image segments captured so far in multimedia the recording session.

The best video or the best image can be selected by analyzing the received metadata and merging the images or video if they are overlapping in time. The selection of the best video segments and the best image segments may also be done based on parameters related to camera settings. For example, the user can specify a filter to select the time duration of the video, camera settings, light and resolution. In an embodiment, the collaborative management agent 106 can be configured to automatically analyze the received metadata to identify the images or video segments based on best camera settings, lighting, or resolution among all the user's devices.

At 702, a collage of the best pictures can be generated on one of the electronic devices. At 704, a short video composed by one of the electronic device is shown. The short video is 30 minutes in duration including the best video segments and the best image segments.

FIG. 8 shows an example scenario for composing a resultant summary video file by discarding blurred multimedia stream based on an analysis of metadata received from a plurality of electronic devices in a collaborative environment according to an embodiment of the present disclosure.

Referring to FIG. 8, metadata can be filtered, based on camera settings like exposure, orientation, position, zooming, panning, media type, backlight, focus, mode, flash, shutter speed, camera movement speed, and/or using algorithms that analyzes the edges in a given image to identify and discard the blurred multimedia streams. It is to be noted that there are many ways to detect blurriness in the video or image. The blurred multimedia streams can be discarded and the non-blurred multimedia streams qualify to a next level of filtering to be part of the resultant multimedia video.

Referring to FIG. 8 different multimedia streams are illustrated, where the multimedia streams are of a picnic captured by different users John, Tom, Ben and Sam. The illustration of FIG. 8 is similar to the illustration of FIG. 7. As such, redundant descriptions thereof are not included.

From the metadata analysis, the metadata associated with the blurred multimedia streams get discarded and it can be identified that the metadata associated with the multimedia stream from the user Tom is the best. It is to be understood that the blurriness of the video segment or image is one of the several criteria's used for resultant video segment or image selection.

Figure 9:
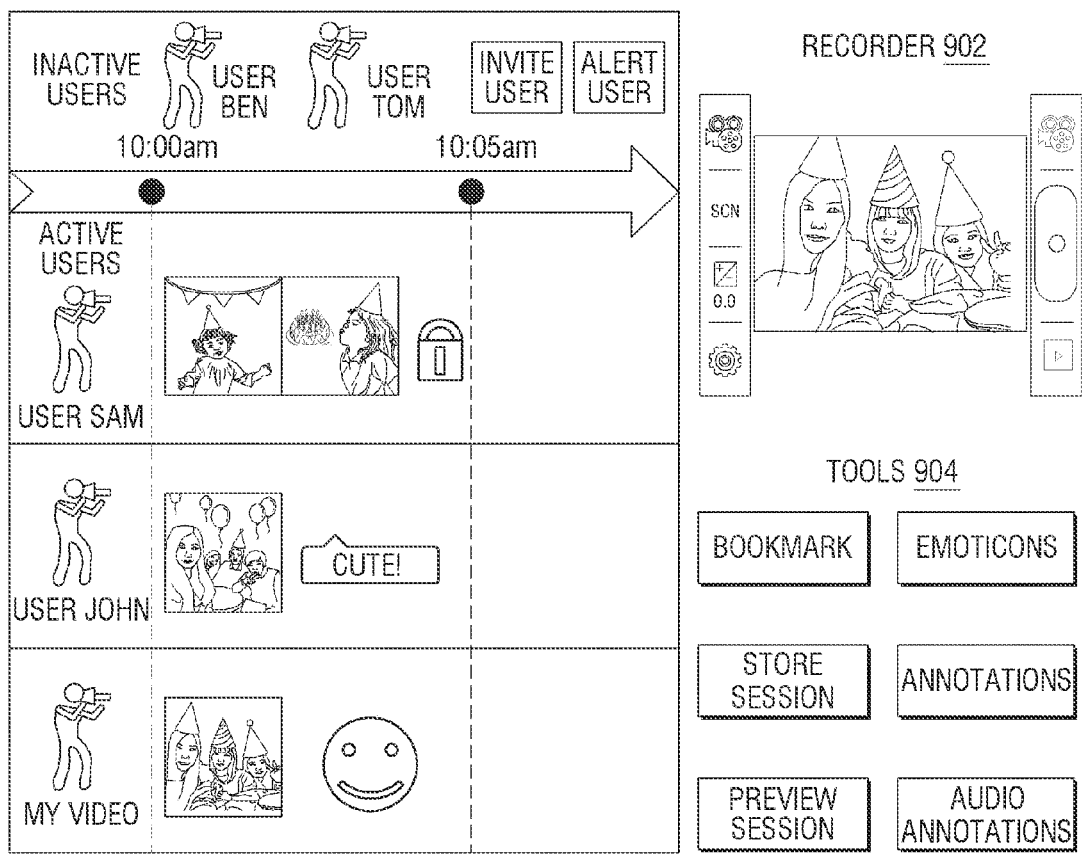
FIG. 9 shows an example illustration of a user interface of an electronic device in a collaborative recording session based on an analysis of metadata received from a plurality of electronic devices in a collaborative environment according to an embodiment of the present disclosure.

FIG. 9 shows an example illustration of a user interface of an electronic device in a collaborative recording session based on an analysis of metadata received from a plurality of electronic devices in a collaborative environment according to an embodiment of the present disclosure.

Referring to FIG. 9, the collaborative management agent 106, as illustrated in FIG. 2, displays the active second electronic device 104, as illustrated in FIG. 2, and thumbnails received at the first electronic device 102, as illustrated in FIG. 2. The user "My video" depicts multimedia streams recorded by the first electronic device 102. Users Sam and John represent two active second electronic devices 104.

As illustrated in FIG. 9, it can be seen that the thumbnails received from the second electronic device 104 are updated periodically. The collaborative management agent 106 also displays the event being captured currently by a recorder 902 of the first electronic device 102. The collaborative management agent 106 provides an interactive collaborative session using various interactive tools 904. Examples of tools 904 used for an interactive collaborative session can include, but are not limited to, annotations, emoticons, bookmark, audio annotations, audio message, video message, store session and previous session.

The user can add a textual annotation, an audio annotations, an emoticons, a pin (bookmark), lock a scene (the chosen scene is mandatorily included in a resultant video) and send alerts on the video during the collaborative session. The annotations can be used for analysis and for drawing attention of other users during an important event. The collaborative management agent 106 can be configured to lock the previewed thumbnails based on interest. In FIG. 9, the user of the first electronic device 102 has locked both the thumbnails received from the electronic device of user Sam. The multimedia stream related to the preview thumbnails can be included in the resultant multimedia recording created by the first electronic device 102.

FIG. 9 shows two inactive users Ben and Tom present in the collaborative session. The collaborative management agent 106 of the first electronic device 102 may alert and/or invite the inactive users in the collaborative session based on the analysis of the metadata. In an embodiment, the interactions of user with the representative thumbnails allows the collaborative multimedia agent 108 to identify the interesting video or images in the event being recorded.

Figure 10:
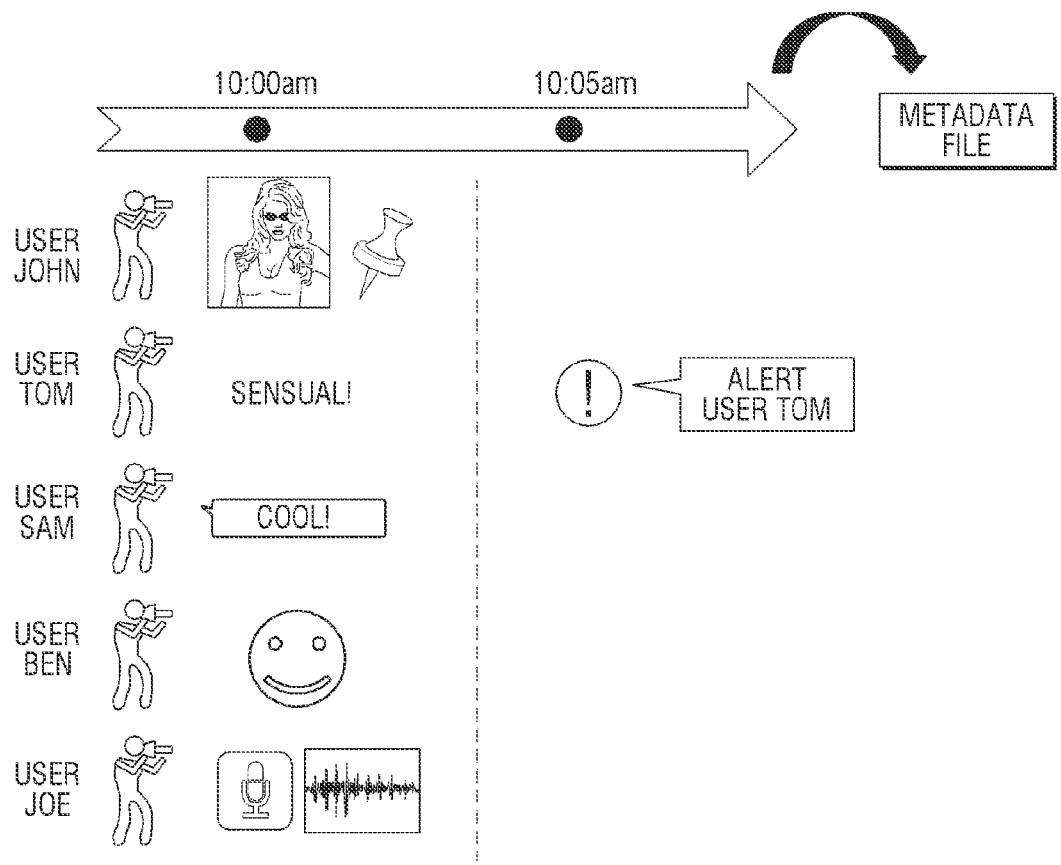
FIG. 10 shows an example illustration of various comments received from a plurality of users in a collaborative environment according to an embodiment of the present disclosure.

FIG. 10 shows an example illustration of various comments received from a plurality of users in a collaborative environment according to an embodiment of the present disclosure.

Referring to FIG. 10, different comments are illustrated, where the different comments may include emoticons and audio messages sent for an image received from the electronic device of user John at 10 AM. The other users (Tom, Sam, Ben, and Joe) can request John for the picture if desired.

In an embodiment, the proposed system and method allows real time interactions and information sharing (e.g. information to automatically select best images and video segments from the second electronic device 104, as illustrated in FIG. 2. An example of the real time information sharing can include, but is not limited to, a time of recording, a position and angle of recording, location, camera event info (zoom, focus etc.), the preferences set by the first electronic device 102, as illustrated in FIG. 2, the preferences set by the second electronic device 104, the scenes selected by each user of the second electronic device 104, templates, alerting, textual annotation, audio annotation, emoticon, bookmarking, audio frame metadata (e.g., pitch, classification, power, etc.), image metadata (e.g., face info, feature information like feature points, edges, color, texture, etc.), camera movement, object detection and tracking.

In an embodiment, camera settings can be analyzed for the best quality image selection. For example, the camera setting can be exposure triangle, orientation, position, flash setting, media type, resolution, back light, histogram or the like.

In another embodiment, the camera setting can be analyzed for the best quality video selection. For example, the camera setting can be a zooming, panning, focus, etc.

Figure 11:
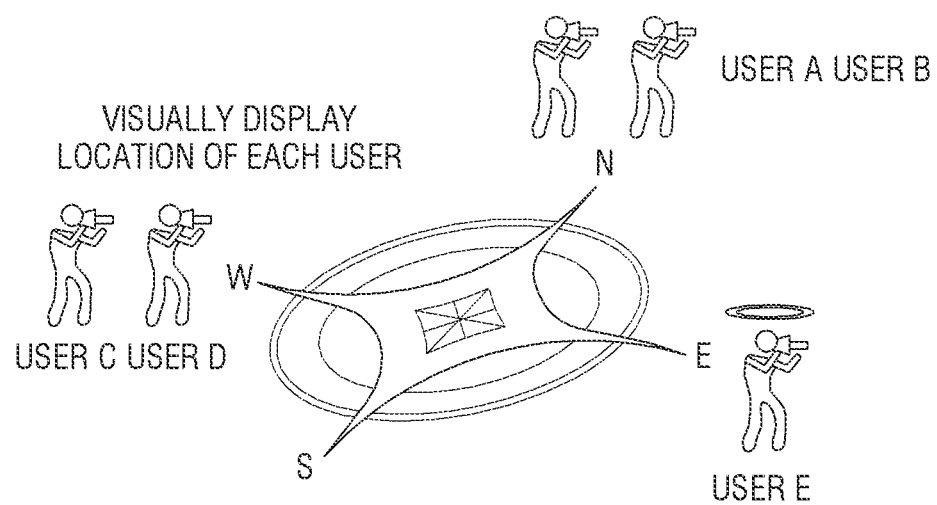
FIG. 11 is an example illustration of a visual layout generated by a collaborative management agent at a user interface according to an embodiment.

FIG. 11 is an example illustration of a visual layout generated by a collaborative management agent at a user interface according to an embodiment of the present disclosure.

Referring to FIG. 11, a collaborative management agent 106, as illustrated in FIG. 2, of the first electronic device 102, as illustrated in FIG. 2, can be configured to generate a visual layout indicating a user density around an important event. Specifically, referring to FIG. 11, visual layout depicts a location of an entirety of the electronic devices capturing the event collaboratively, where a compass type of environment, with the location of each user, is illustrated.

The location of each user in the collaborative session can be determined by using systems like Global Positioning Systems (GPS), Wi-Fi based indoor positioning systems or other location positioning mechanisms. FIG. 11 shows the electronic devices of users A and B recording an event from a north position, the electronic devices of users C and D recording from a west position and the electronic device of a user E recording from an east position. The indicator on the user E's head indicates that the electronic device of user E is currently recording an important event. Based on the visual layout displayed on the user interface, users A, B, C and D can identify the recording of the important event and move to record the important event.

Figure 12A:
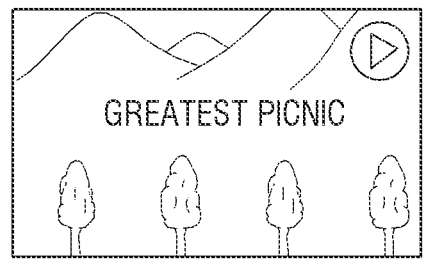
FIGS. 12A, 12B, and 12C are example illustrations of themes suggested for events by a collaborative management agent according to various embodiments of the present disclosure.
Figure 12B:
Figure 12C:

FIGS. 12A, 12B, and 12C are example illustrations of themes suggested for events by a collaborative management agent according to various embodiments of the present disclosure.

Referring to FIGS. 12A, 12B and 12C, based on audio and video cues detected in an analysis of metadata associated with multimedia streams, the collaborative management agent 106, as illustrated in FIG. 2, can suggest different themes to users for a resultant composed video of the events.

Referring to FIG. 12A, a title called the greatest picnic is illustrated, where the title is based on a picnic based theme suggested by the collaborative management agent 106.

Referring to FIG. 12B, a title called we are family is illustrated, where the title is based on a family based theme suggested by the collaborative management agent 106.

Referring to FIG. 12C, a title called a love story is illustrated, where the title is based on a romantic based theme suggested by the collaborative management agent 106.

Figure 13:
FIG. 13 is an example illustration of a selection of multimedia streams based on an audio analysis of metadata received from a plurality of electronic devices according to an embodiment of the present disclosure.

FIG. 13 is an example illustration of a selection of multimedia streams based on an audio analysis of metadata received from a plurality of electronic devices according to an embodiment of the present disclosure. Based on the metadata analysis including the audio analysis of the multimedia stream, metadata corresponding to a clear audio in the multimedia stream can be selected.

Referring to FIG. 13, audio quality is illustrated, where the audio quality is associated with multimedia streams recorded by electronic devices of users John, Tom and Sam. Metadata analysis results show that the multimedia streams recorded by Tom and Sam include noisy speech, while the multimedia stream recorded by John has pure speech. The analysis engine 204, as illustrated in FIG. 2, can discard the metadata received from the electronic devices of users Tom and Sam and select the metadata received from the electronic device of John.

Figure 14B:
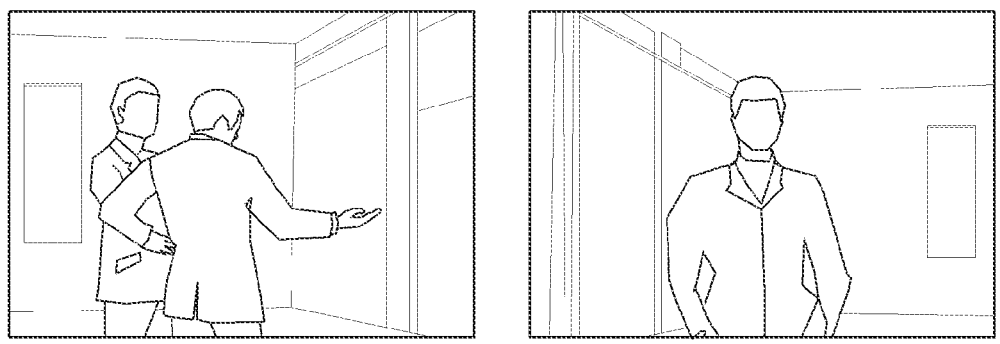
Figure 14C:
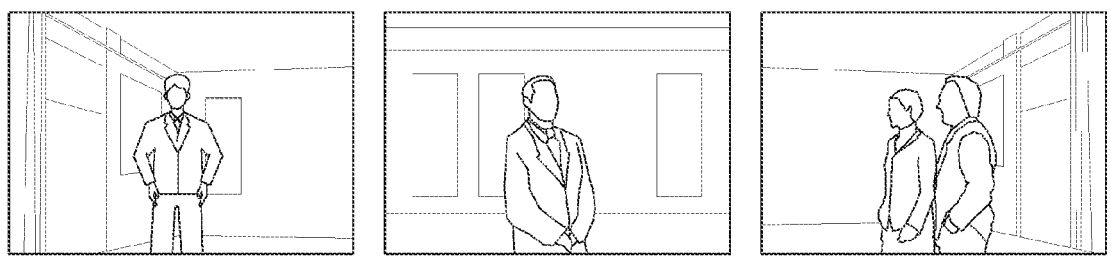

FIGS. 14A, 14B, and 14C are example illustrations showing final video snapshots of an office event in a collaborative recording environment according to various embodiments of the present disclosure.

Referring to FIG. 14A, a same scene captured by two different electronic devices is illustrated. Using metadata received from different electronic devices, the analysis engine 204, as illustrated in FIG. 2, can identify that the scenes of the event are being captured from different perspectives. Based on user defined attributes or a set of predetermined attributes, interesting scenes recorded from different perspectives can be included in the resultant metadata file. The resultant multimedia video can include both of the video scenes that are recorded from different perspectives. In an embodiment, the resultant video file can be composed as a video collage using graphical effects. This type of video collage makes the output composite video interesting as the viewer of the resultant multimedia video can see a given video scene from multiple interesting perspectives.

Referring to FIG. 14B, a video segment composed of an important video segment and an image in a collage sort of graphical effect is illustrated. In a given scenario, the video segment may be selected based on some predefined attribute and the images have been captured in the same time interval and may be selected based on the predefined attribute.

Referring to FIG. 14C, a collage of images is illustrated, where the collage is created by fetching images associated based on an analysis of metadata received from electronic devices. Each metadata can be associated with the first electronic device 102, as illustrated in FIG. 2, or with the second electronic device 104, as illustrated in FIG. 2. This is a scenario where a video segment and images from three users were selected based on predefined set of criteria or rules.

Figure 15A:
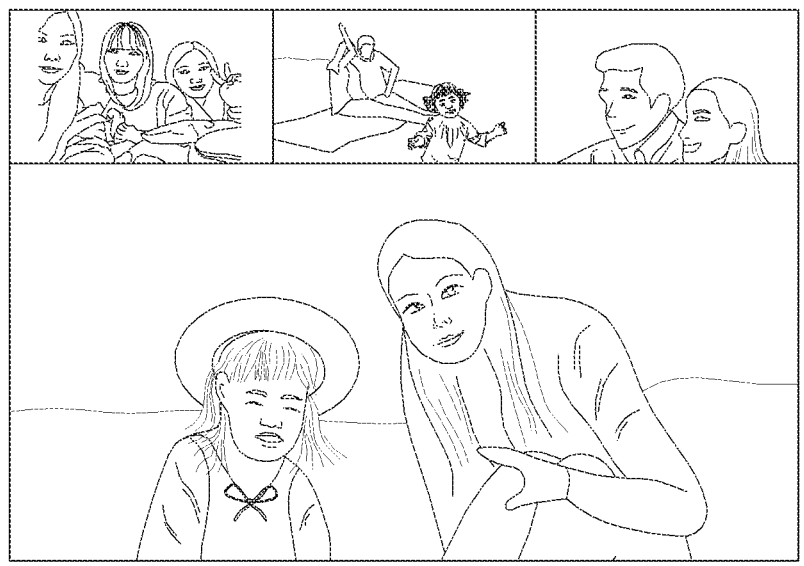
FIGS. 15A, 15B, and 15C show example illustrations of video or image collages created during a collaborative session according to various embodiments of the present disclosure.
Figure 15B:
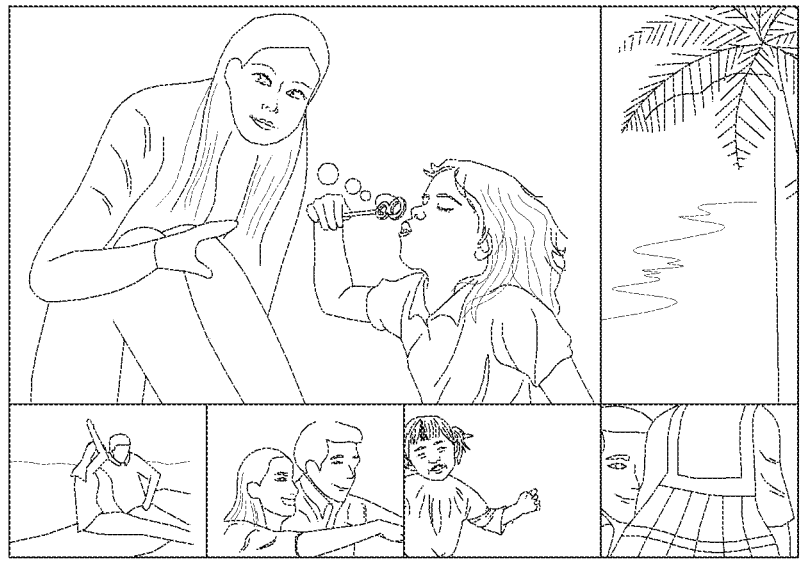
Figure 15C:
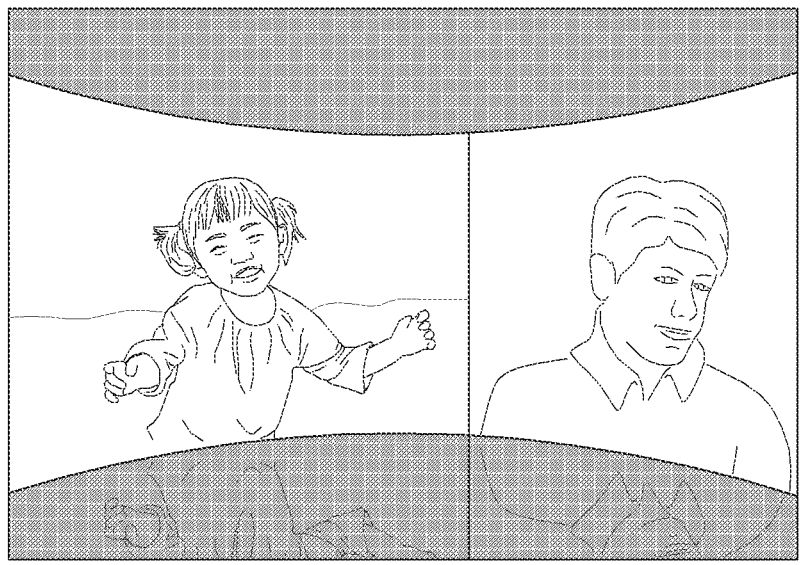

FIGS. 15A, 15B, and 15C show example illustrations of video or image collages created during a collaborative session according to various embodiments of the present disclosure.

Referring to FIG. 15A, a collage of images taken at a school event is illustrated, where the collage of images is created by the collaborative management agent 106, as illustrated in FIG. 2.

Referring to FIG. 15B, a collage of images taken at a family picnic event is illustrated, where the collage of images is created by the collaborative management agent 106, as illustrated in FIG. 2.

Referring to FIG. 15C, a collage of best images taken at a family picnic event are illustrated, where the collage of best images is created by the collaborative management agent 106, as illustrated in FIG. 2.

Figure 16:
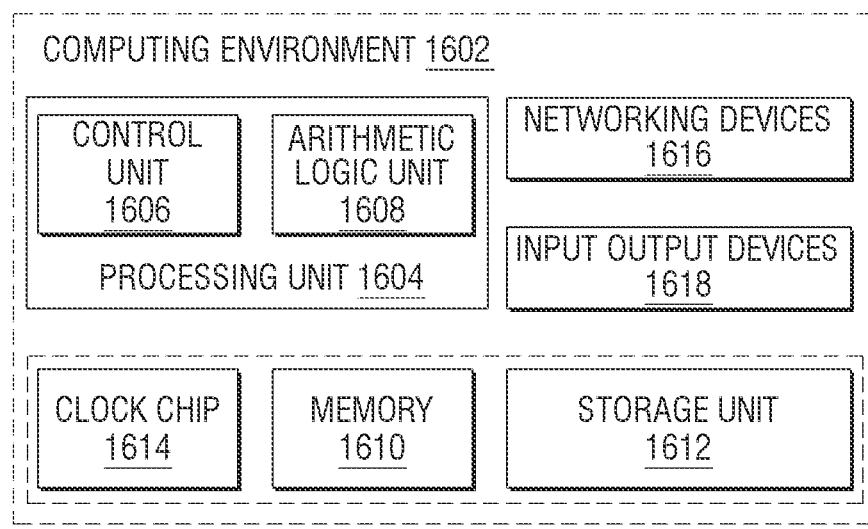
FIG. 16 depicts a computing environment implementing a method and system for coordinating a collaborative multimedia recording according to an embodiment of the present disclosure.

FIG. 16 depicts a computing environment implementing a method and system for coordinating a collaborative multimedia recording according to an embodiment of the present disclosure.

Referring to FIG. 16, as illustrated, a computing environment 1602 comprises at least one processing unit 1604 that is equipped with a control unit 1606 and an Arithmetic Logic Unit (ALU) 1608, a memory 1610, a storage unit 1612, a clock chip 1614, a plurality of networking devices 1616, and a plurality of Input output (I/O) devices 1618.

The processing unit 1604 is responsible for processing instructions of an algorithm. The processing unit 1604 receives commands from the control unit 1606 in order to perform its processing. Further, any logical and arithmetic operations involved in the execution of the instructions are computed with the help of the ALU 1608. The overall computing environment 1602 can be composed of multiple homogeneous or heterogeneous cores, multiple CPUs of different kinds, special media and other accelerators. The processing unit 1604 is responsible for processing the instructions of the algorithm. The processing unit 1604 receives commands from the control unit 1606 in order to perform its processing. Further, any logical and arithmetic operations involved in the execution of the instructions are computed with the help of the ALU 1608.

Additionally, the processing unit 1604 may include a plurality of process units that may be located on a single chip or over multiple chips. The algorithm comprising of instructions and codes required for the implementation are stored in either the memory unit 1610 or the storage 1612 or both. At the time of execution, the instructions may be fetched from the corresponding memory 1610 or storage 1612, and executed by the processing unit 1604. The processing unit 1604 synchronizes the operations and executes the instructions based on the timing signals generated by the clock chip 1614.

The embodiments disclosed herein can be implemented through at least one software program running on at least one hardware device and performing network management functions to control the elements. The embodiments disclosed herein can be implemented through at least one software program running on at least one hardware device and performing network management functions to control the elements. The elements shown in FIGS. 1, 2 and 16 may include blocks which can be at least one of a hardware device, or a combination of hardware device and software module.

Figure 17:
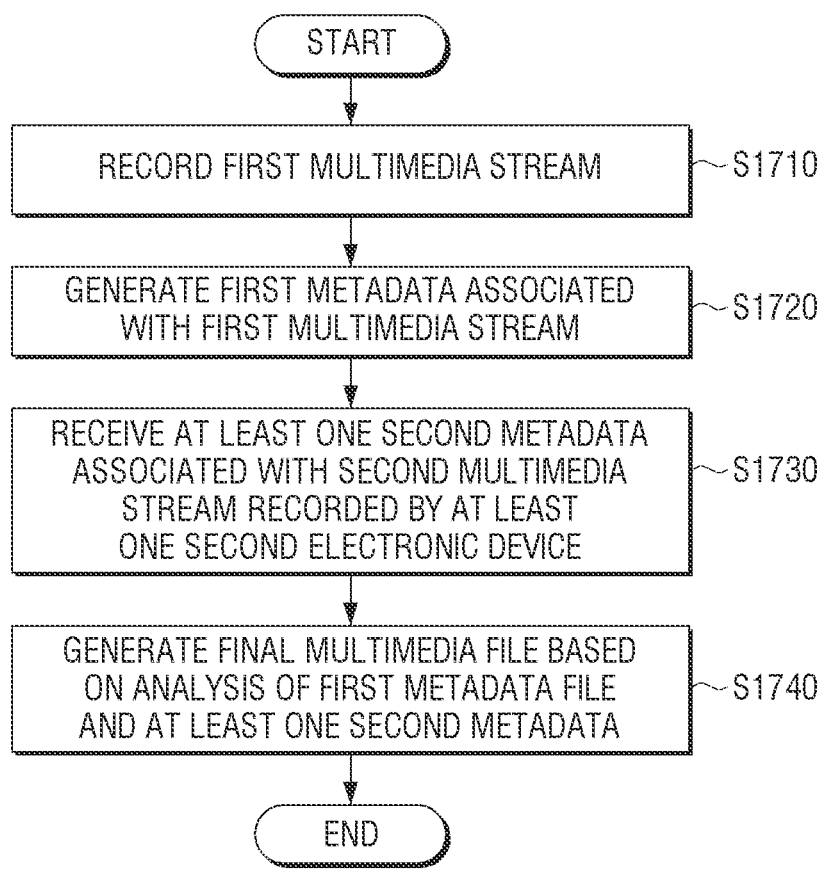
FIG. 17 is a flowchart provided to explain a controlling method of an electronic device according to an embodiment of the present disclosure.

FIG. 17 is a flowchart provided to explain a controlling method of an electronic device according to an embodiment of the present disclosure.

Referring to FIG. 17, a method is illustrated, in which an electronic device is configured to record S1710 a first multimedia stream.

Then, the electronic device is configured to generate S1720 a first metadata associated with the first multimedia stream.

Then, the electronic device is configured to receive S1730 at least one second metadata associated with a second multimedia stream recorded by at least one second electronic device.

Then, the electronic device is configured to, based on an analysis of the first metadata and the at least one second metadata, generate S1740 a final multimedia file.

In addition, the generating S1740 of the final multimedia file includes analyzing the first metadata and the at least one second metadata based on at least one parameter, receiving at least a part of the second multimedia stream from at least one second electronic device based on the analysis, and combining at least a part of the first multimedia stream and at least a part of the second multimedia stream, wherein the at least a part of the first multimedia stream may be selected based on the analysis.

In addition, the composing of the resultant multimedia file may analyze the first metadata and the at least one second metadata based on at least one parameter, and generate a final multimedia stream using an audio with the lowest noise among the first multimedia stream and the second multimedia stream based on the analysis.

In addition, in the generating S1740 of the final multimedia file, the first metadata and the at least one second metadata may be based on at least one parameter, and the generating S1740 may generate the final multimedia stream in the form of collage based on the analysis.

In addition, the generating S1740 of the final multimedia file includes analyzing the first metadata and the at least one second metadata based on at least one parameter, determining if the first metadata and the at least one second metadata based on the analysis, and in response to determining that the first metadata and the at least one second metadata coincide, transmitting a warning message to at least one second electronic device, wherein the warning message may indicate that the first electronic device and the second electronic device are recording visually similar multimedia streams.

In addition, the generating S1740 of the final multimedia file may include analyzing the first metadata and at least one second metadata based on at least one parameter, identifying popularity of the at least one second metadata based on the analysis, and based on the identified popularity, generating a visual layout indicating locations of the first electronic device and the at least one second electronic device.

In addition, the generating S1740 of the final multimedia file may include analyzing the first metadata and the at least one second metadata based on at least one parameter, determining if the first electronic device and the at least one second electronic device are proximate based on the analysis, and in response to determining that the first electronic device and the at least one second electronic device are proximate, transmitting a warning message to the at least one second electronic device.

In addition, the generating S1740 of the final multimedia file may include analyzing the first metadata and the at least one second metadata based on at least one parameter, and sharing at least one representative thumbnail with the at least one second electronic device based on the analysis.

Figure 18:
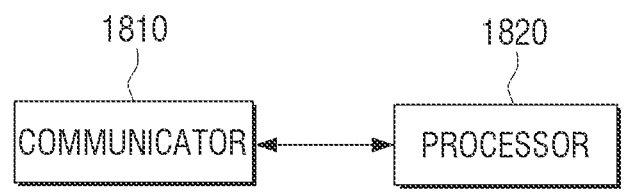
FIG. 18 is a block diagram illustrating a configuration of an electronic device according to an embodiment of the present disclosure.

FIG. 18 is a block diagram illustrating a configuration of an electronic device according to an embodiment of the present disclosure.

Referring to FIG. 18, a first electronic device 102 is illustrated, where the first electronic device 102 is configured to record multimedia and includes a communicator 1810 and a processor 1820.

The communicator 1810 is configured to communicate with at least one second electronic device 104, as illustrated in FIG. 2. The communicator 1810 may perform a one-directional or bi-directional communication with the at least one second electronic device. In response to performing the one-directional communication, the communicator 1810 may receive a signal from the at least one second electronic device 104. In response to performing the bi-directional communication, the communicator 1810 may receive a signal from the at least one second electronic device 104 or transmit a signal to the at least one second electronic device 104.

The processor 1820 may record a first multimedia stream, generate a first metadata associated with the first multimedia stream, receive at least one second metadata associated with a second multimedia stream recorded by at least one second electronic device 104, and based on an analysis of the first metadata and the at least one second metadata, generate a final multimedia file.

In addition, the processor 1820 may analyze the first metadata and the at least one second metadata based on at least one parameter, receive at least a part of the second multimedia stream from at least one second electronic device 104 based on the analysis, and generate a final multimedia stream by combining at least a part of the first multimedia stream and at least a part of the second multimedia stream, wherein the at least a part of the first multimedia stream may be selected based on the analysis.

In addition, the processor 1820 may analyze the first metadata and the at least one second metadata based on at least one parameter, and generate a final multimedia stream using an audio with the lowest noise among the first multimedia stream and the second multimedia stream based on the analysis.

In addition, the processor 1820 may analyze the first metadata and the at least one second metadata based on at least one parameter, and generate the final multimedia stream in the form of collage based on the analysis.

In addition, the processor 1820 may analyze the first metadata and the at least one second metadata based on at least one parameter, determine if the first metadata and the at least second metadata coincide based on the analysis, and in response to determining that the first metadata and the at least one second metadata coincide, transmit a warning message to the at least one second electronic device 104, wherein the warning message may indicate that the first electronic device 102 and the second electronic device are recording visually similar multimedia streams.

In addition, the processor 1820 may analyze the first metadata and the at least one second metadata based on at least one parameter, identify popularity of the at least one second metadata based on the analysis, and based on the identified popularity, generate a visual layout indicating locations of the first electronic device and the at least one second electronic device.

In addition, the processor 1820 may analyze the first metadata and the at least one second metadata based on at least one parameter, determine if the first electronic device 102 and the at least one second electronic device 104 are proximate based on the analysis, and in response to determining that the first electronic device 102 and the at least one second electronic device 104 are proximate, transmit a warning message to the at least one second electronic device 104.

In addition, the processor 1820 may analyze the first metadata and the at least one second metadata based on at least one parameter, and share at least one representative thumbnail with the at least one second electronic device 104 based on the analysis.

Figure 19:
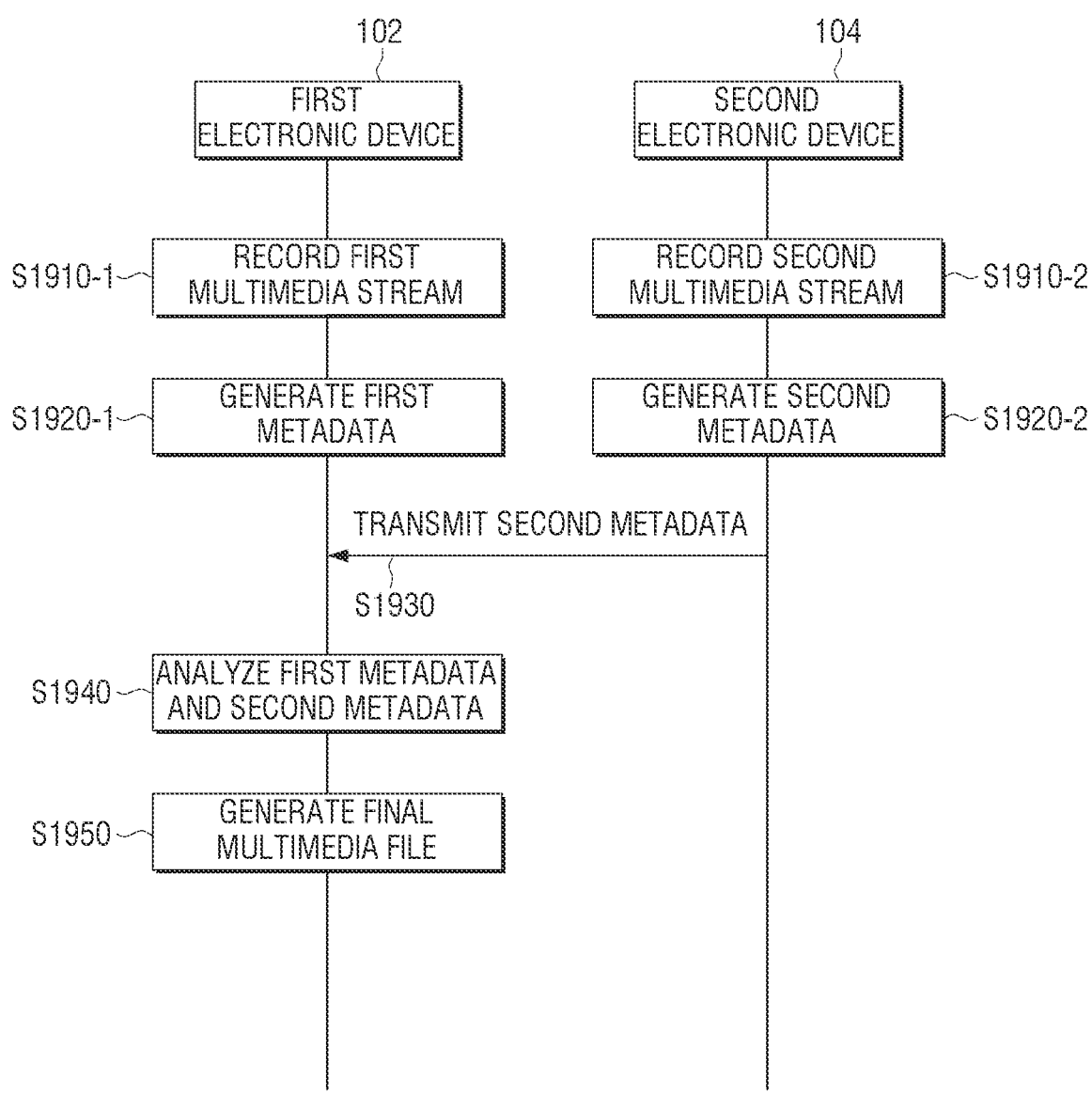
FIG. 19 is a sequential diagram provided to explain a system according to an embodiment of the present disclosure.

FIG. 19 is a sequential diagram provided to explain a system according to an embodiment of the present disclosure.

Referring to FIG. 19, a system including a first electronic device 102 and a second electronic device 104 is illustrated, where the system is for recording a multimedia.

According to FIG. 19, the first electronic device 102 may, record S1910-1 a first multimedia stream. Further, the second electronic device 104 may record S1910-2 a second multimedia stream.

In addition, the first electronic device 102 is configured to generate S1920-1 a first metadata associated with the first multimedia stream, and the second electronic device 104 is configured to generate S1920-2 a second metadata associated with the second multimedia stream. It has been shown that the first multimedia stream and the second multimedia stream are recorded simultaneously, and yet, this may vary according to a type of electronic device. For example, the first electronic device 102 may directly record the first multimedia stream, whereas the second electronic device 104 may not record the second multimedia stream directly, but store it in a buffer and then record the stored multimedia stream according to a user command.

Moreover, it has been shown that the first metadata and the second metadata are simultaneously generated as well, and yet, this is only an example. For example, the first electronic device 102 may generate the first metadata when the first multimedia stream is recorded, and yet, the second electronic device 104 may generate the second metadata according to a user command or upon a request from another electronic device after the second multimedia stream is recorded.

In addition, the second electronic device 104 is configured to transmit S1930 a second metadata associated with the second multimedia stream to the first electronic device 102. In addition, the first electronic device 102 is configured to analyze S1940 the first metadata and the second metadata, and generate S1950 a final multimedia file based on the analysis.

Meanwhile, FIG. 19 shows that the second electronic device 104 is only one, but is not limited thereto. For example, the second electronic device 104 may be more than one, and accordingly, the first electronic device 102 may receive a plurality of second metadata associated with a plurality of second multimedia streams recorded in a plurality of second electronic devices 104 as well.

According to the above-described various embodiments, the electronic device may receive only metadata from another electronic device, and select an image to be synthesized. Accordingly, images of various viewpoints received may be synthesized to be provided to a user, thereby enhancing a user satisfaction.

Meanwhile, methods according to such various embodiments may be programmed and stored in various storage mediums. Accordingly, the above-mentioned methods according to the various embodiments may be realized in various types of electronic devices which execute the storage mediums.

Various aspects of the present disclosure can also be embodied as computer readable code on a non-transitory computer readable recording medium. A non-transitory computer readable recording medium is any data storage device that can store data which can be thereafter read by a computer system. Examples of the non-transitory computer readable recording medium include Read-Only Memory (ROM), Random-Access Memory (RAM), CD-ROMs, magnetic tapes, floppy disks, and optical data storage devices. The non-transitory computer readable recording medium can also be distributed over network coupled computer systems so that the computer readable code is stored and executed in a distributed fashion. Also, functional programs, code, and code segments for accomplishing the present disclosure can be easily construed by programmers skilled in the art to which the present disclosure pertains.

At this point it should be noted that various embodiments of the present disclosure as described above typically involve the processing of input data and the generation of output data to some extent. This input data processing and output data generation may be implemented in hardware or software in combination with hardware. For example, specific electronic components may be employed in a mobile device or similar or related circuitry for implementing the functions associated with the various embodiments of the present disclosure as described above. Alternatively, one or more processors operating in accordance with stored instructions may implement the functions associated with the various embodiments of the present disclosure as described above. If such is the case, it is within the scope of the present disclosure that such instructions may be stored on one or more non-transitory processor readable mediums. Examples of the processor readable mediums include Read-Only Memory (ROM), Random-Access Memory (RAM), CD-ROMs, magnetic tapes, floppy disks, and optical data storage devices. The processor readable mediums can also be distributed over network coupled computer systems so that the instructions are stored and executed in a distributed fashion. Also, functional computer programs, instructions, and instruction segments for accomplishing the present disclosure can be easily construed by programmers skilled in the art to which the present disclosure pertains.

Specifically, according to an embodiment, a non-transitory computer readable medium may be provided, in which a program is stored configured to sequentially perform recording a first multimedia stream, generating a first metadata associated with the first multimedia stream, receiving at least one second metadata associated with a second multimedia stream recorded by at least one second electronic device, and based on an analysis of the first metadata and the at least one second metadata, generating a final multimedia file.

The non-transitory computer readable medium refers to a medium which may store data semi-permanently rather than storing data for a short time such as a register, a cache, and a memory and may be readable by an apparatus. Specifically, the above-mentioned various applications or programs may be stored and provided in a non-transitory computer readable medium such as CD, a digital versatile disk (DVD), hard disk, Blu-ray disc, a universal serial bus (USB) device, a memory card, ROM, etc.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method of controlling a first electronic device for performing multimedia recording, the method comprising:
   recording, by the first electronic device, a first multimedia stream;
   generating a first metadata associated with the first multimedia stream;
   receiving, at the first electronic device, at least one second metadata associated with a second multimedia stream recorded by at least one second electronic device; and
   generating, by the first electronic device, a final multimedia file based on an analysis of the first metadata and the at least one second metadata,
   wherein the generating of the final multimedia file comprises:
     analyzing the first metadata and the at least one second metadata based on at least one parameter, and
     generating the final multimedia stream using an audio with a lowest noise among audio of the first multimedia stream and the second multimedia stream, based on the analyzing of the first metadata and the at least one second metadata.

2. The method as claimed in claim 1,
   wherein the generating of the final multimedia file includes:
     analyzing the first metadata and the at least one second metadata based on the at least one parameter;
     receiving at least a part of the second multimedia stream from the at least one second electronic device based on the analyzing of the first metadata and the at least one second metadata; and
     combining at least a part of the first multimedia stream and at least a part of the second multimedia stream, and
   wherein the at least a part of the first multimedia stream is selected based on the analyzing of the first metadata and the at least one second metadata.

3. The method as claimed in claim 1, wherein the generating of the final multimedia file comprises:
   analyzing the first metadata and the at least one second metadata based on the at least one parameter; and
   generating the final multimedia stream in a form of a collage based on the analyzing of the first metadata and the at least one second metadata.

4. The method as claimed in claim 1,
   wherein the generating of the final multimedia file includes:
     analyzing the first metadata and the at least one second metadata based on the at least one parameter;
     determining whether the first metadata and the at least one second metadata coincide based on the analyzing of the first metadata and the at least one second metadata; and
     in response to determining that the first metadata and the at least one second metadata coincide, transmitting a warning message to the at least one second electronic device, and
   wherein the warning message indicates that the first electronic device and the at least one second electronic device are recording visually similar multimedia streams.

5. The method as claimed in claim 1, wherein the generating of the final multimedia file includes:
   analyzing the first metadata and the at least one second metadata based on the at least one parameter;
   identifying a popularity of the at least one second metadata based on the analyzing of the first metadata and the at least one second metadata; and
   generating a visual layout indicating locations of the first electronic device and the at least one second electronic device based on the identified popularity.

6. The method as claimed in claim 1, wherein the generating of the final multimedia file includes:
   analyzing the first metadata and the at least one second metadata based on the at least one parameter;
   determining whether the first electronic device and the at least one second electronic device are proximate based on the analyzing of the first metadata and the at least one second metadata; and
   in response to determining that the first electronic device and the at least one second electronic device are proximate, transmitting a warning message to the at least one second electronic device.

7. The method as claimed in claim 1, further comprising:
   analyzing the first metadata and the at least one second metadata by performing metadata mapping to determine whether visually similar multimedia streams have been recorded in the first electronic device and the at least one second electronic device; and
   alerting a user of the at least one second electronic device when the analyzing of the first metadata and the at least one second metadata determines that visually similar multimedia streams are recorded in the first electronic device and the at least one second electronic device.

8. The method as claimed in claim 1, wherein the at least one parameter comprises at least one of camera settings, time stamps, emotion detection, face detection and recognition, audio detection and classification, motion detection, blur detection, hand shake detection, feature extraction, location information, important event detection, redundancy detection, object information, zoom detection, camera focus, human detection, behavior detection, image quality detection, feature detection, object detection, and recognition information.

9. A first electronic device configured to perform multimedia recording, the first electronic device comprising:
   a transceiver configured to communicate with at least one second electronic device; and
   a processor configured to:
     record a first multimedia stream,
     generate a first metadata associated with the first multimedia stream,
     receive, using the transceiver, at least one second metadata associated with a second multimedia stream recorded by the at least one second electronic device, and
     based on an analysis of the first metadata and the at least one second metadata, generate a final multimedia file,
   wherein the processor is further configured to:
     analyze the first metadata and the at least one second metadata based on at least one parameter, and
     generate the final multimedia stream using an audio with a lowest noise among audio of the first multimedia stream and the second multimedia stream based on the analysis of the first metadata and the at least one second metadata.

10. The first electronic device as claimed in claim 9, wherein the processor is further configured to:
analyze the first metadata and the at least one second metadata based on the at least one parameter,
receive at least a part of the second multimedia stream from the at least one second electronic device based on the analysis of the first metadata and the at least one second metadata, and
generate the final multimedia stream by combining at least a part of the first multimedia stream and at least a part of the second multimedia stream, and
wherein the at least a part of the first multimedia stream is selected based on the analysis of the first metadata and the at least one second metadata.

11. The first electronic device as claimed in claim 9, wherein the processor is further configured to:
analyze the first metadata and the at least one second metadata based on at least one parameter, and
generate the final multimedia stream in a form of a collage based on the analysis of the first metadata and the at least one second metadata.

12. The first electronic device as claimed in claim 9, wherein the processor is further configured to:
analyze the first metadata and the at least one second metadata based on at least one parameter,
determine whether the first metadata and the at least one second metadata coincide based on the analysis of the first metadata and the at least one second metadata, and
in response to determining that the first metadata and the at least one second metadata coincide, transmit a warning message to the at least one second electronic device, and
wherein the warning message indicates that the first electronic device and the at least one second electronic device are recording visually similar multimedia streams.

13. The first electronic device as claimed in claim 9, wherein the processor is further configured to:
analyze the first metadata and the at least one second metadata based on at least one parameter,
identify a popularity of the at least one second metadata based on the analysis of the first metadata and the at least one second metadata, and
generate a visual layout indicating locations of the first electronic device and the at least one second electronic device based on the identified popularity.

14. The first electronic device as claimed in claim 9, wherein the processor is further configured to:
analyze the first metadata and the at least one second metadata based on the at least one parameter,
determine whether the first electronic device and the at least one second electronic device are proximate based on the analysis of the first metadata and the at least one second metadata, and
in response to determining that the first electronic device and the at least one second electronic device are proximate, transmit a warning message to the at least one second electronic device.

15. The first electronic device as claimed in claim 9, wherein the processor is further configured to:
analyze the first metadata and the at least one second metadata based on the at least one parameter, and
share at least one representative thumbnail with the at least one second electronic device based on the analysis of the first metadata and the at least one second metadata.

16. The first electronic device as claimed in claim 9, wherein the first metadata includes at least one of
camera settings,
time stamps,
emotion detection,
face detection and recognition,
audio detection and classification,
motion detection,
blur detection,
handshake detection,
feature detection,
location information,
human detection,
behavior detection,
image quality detection, and
object detection and recognition information.

17. The first electronic device as claimed in claim 9, wherein the at least one second metadata includes at least one of camera settings, time stamps, emotion detection, face detection and recognition, audio detection and classification, motion detection, blur detection, hand shake detection, feature detection, location information, human detection, behavior detection, image quality detection, object detection and recognition information.

18. The first electronic device as claimed in claim 9, wherein the processor is further configured to:
form a shared operation session with the at least one second electronic device using a communication network.

19. The first electronic device as claimed in claim 9, wherein the at least one parameter comprises at least one of camera settings, time stamps, emotion detection, face detection and recognition, audio detection and classification, motion detection, blur detection, hand shake detection, feature extraction, location information, important event detection, redundancy detection, object information, zoom detection, camera focus, human detection, behavior detection, image quality detection, feature detection, object detection, and recognition information.

20. A system for performing multimedia recording, the system comprising:
a first electronic device having a processor configured to:
record a first multimedia stream, and
generate a first metadata associated with the first multimedia stream; and
at least one second electronic device having processors, the processors configured to record a second multimedia stream,
wherein the processor of the first electronic device is further configured to:
receive at least one second metadata associated with the second multimedia stream recorded by at least one second electronic device, and
based on an analysis of the first metadata and the at least one second metadata, generate a final multimedia file,
wherein the processor of the first electronic device is further configured to:
analyze the first metadata and the at least one second metadata based on at least one parameter, and
generate the final multimedia stream using an audio with a lowest noise among audio of the first multimedia stream and the second multimedia stream based on the analysis of the first metadata and the at least one second metadata.

21. The system as claimed in claim 20, wherein the at least one parameter comprises at least one of camera settings, time stamps, emotion detection, face detection and recognition, audio detection and classification, motion detection, blur detection, hand shake detection, feature extraction, location information, important event detection, redundancy detection, object information, zoom detection, camera focus, human detection, behavior detection, image quality detection, feature detection, object detection, and recognition information.

* * * * *